(12) United States Patent
Hojo et al.

(10) Patent No.: US 6,506,849 B1
(45) Date of Patent: Jan. 14, 2003

(54) RUBBER COMPOSITION AND PNEUMATIC TIRE

(75) Inventors: Masahiro Hojo, Kodaira (JP); Yukitoshi Ajiro, Kodaira (JP); Kentaro Fujino, Kodaira (JP); Shunji Baba, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/647,609

(22) PCT Filed: Feb. 7, 2000

(86) PCT No.: PCT/JP00/00659

§ 371 (c)(1),
(2), (4) Date: Jan. 5, 2001

(87) PCT Pub. No.: WO00/46290

PCT Pub. Date: Aug. 10, 2000

(30) Foreign Application Priority Data

| Feb. 5, 1999 | (JP) | ............................................ 11-028700 |
| Feb. 26, 1999 | (JP) | ............................................ 11-050483 |
| Aug. 10, 1999 | (JP) | ............................................ 11-226031 |
| Aug. 10, 1999 | (JP) | ............................................ 11-226032 |
| Aug. 31, 1999 | (JP) | ............................................ 11-245175 |
| Dec. 8, 1999 | (JP) | ............................................ 11-348511 |
| Dec. 15, 1999 | (JP) | ............................................ 11-355688 |
| Dec. 15, 1999 | (JP) | ............................................ 11-355859 |

(51) Int. Cl.$^7$ ............................................ C08F 136/20
(52) U.S. Cl. .................. 525/332.7; 156/96; 525/63
(58) Field of Search ................ 156/96; 525/63, 525/332.7

(56) References Cited

U.S. PATENT DOCUMENTS

| 2,925,407 A | 2/1960 | Goldberg |
| 2,989,504 A | 6/1961 | Little et al. |
| 4,229,550 A | 10/1980 | Jones et al. |
| 4,683,270 A | 7/1987 | Hollaway, Jr. |
| 5,244,028 A | 9/1993 | Segatta et al. |
| 5,616,279 A | 4/1997 | D'Sidocky et al. |
| 5,736,615 A | 4/1998 | D'Sidocky et al. |

FOREIGN PATENT DOCUMENTS

| EP | 0 418 188 A1 | 3/1991 |
| EP | 0 475 222 A1 | 3/1992 |
| EP | 0 564 966 A2 | 10/1993 |
| EP | 0 823 453 A1 | 2/1998 |
| GB | 1 463 922 A | 2/1977 |
| GB | 1 530 534 A | 11/1978 |
| GB | 1 533 227 A | 11/1978 |
| JP | 60-245652 | 5/1985 |
| JP | 63-99251 | 4/1988 |
| JP | 06-025308 | 2/1994 |
| JP | 06-136184 | 5/1994 |
| JP | 10-139934 | 5/1998 |
| WO | WO84/02528 A | 7/1984 |
| WO | WO92/07904 A1 | 5/1992 |

OTHER PUBLICATIONS

JP60 245652, Dec. 5, 1985, Okino Eizo (Patent Abstracts of Japan).
JP 58 198561 A, Abstract, Derwent Publications Ltd., London, GB; Class A26, AN 1984–002969 XP002201009, Nov. 18, 1983.
JP 61 258884 A, Abstract, Derwent Publications Ltd., London, GB; Class A88, AN 1986–343895 XP002201010, Nov. 17, 1996.
JP 02 053831 A, Patent Abstracts of Japan vol. 14, No. 220 10 Feb. 22, 1990.

*Primary Examiner*—Terressa M. Boykin
(74) *Attorney, Agent, or Firm*—Sughrue Mion, PLLC

(57) ABSTRACT

There are provided a rubber composition having a high modulus of elasticity and a good workability, and a pneumatic tire.

A rubber composition comprising at least one of natural rubber and synthetic diene rubbers as a rubber ingredient, at least one maleimide compound, and at least one nitrogen-containing compound selected from the group consisting of polyaniline, hydrazide, and amine compound is used in a tread.

27 Claims, No Drawings

RUBBER COMPOSITION AND PNEUMATIC TIRE

Technical Field of the Invention

This invention relates to a rubber composition and a pneumatic tire, and more particularly to a technique for obtaining a rubber composition having a good workability and a high modulus of elasticity as well as a pneumatic tire.

Prior Art

Recently, it is demanded to develop the steering stability and gripping property higher than the conventional one even in tire performances as power and running speed of automobiles become higher.

In rubber industry, bismaleimide is practically examined as a cross-linking agent. In JP-A-63-99251 is reported that the heat resistance and the high maneuverability are simultaneously established by compounding a bismaleimide compound with a styrene-butadiene copolymer rubber (SBR). And also, the effect of lowering heat build-up through hydrazide as reported in JP-A-10-139934.

Among various road surface conditions, a wet road surface on a rainy day is slippery, so that the running of automobiles is risky. And also, there is recently a tendency to take a regulation to a braking distance and hence wet-skid performances become increasingly important.

As a conventional technique for improving wet-skid performances, there are a method of shifting Tg of a polymer to a higher temperature side to increase tan $\delta$ (0° C.), a method of compounding silica to improve wet performances, and so on.

However, in the former method of increasing tan $\delta$, it is difficult to simultaneously establish other performances such as dry-skid performances, low rolling resistance and the like. And also, in the latter method of compounding silica, there are disadvantages that a lock $\mu$, at wet state (frictional coefficient when a tire is fully locked and slipping 100%) is not improved, and the like.

On the other hand, the applicant has discovered that the wet-skid performances can be improved by using N,N'-(1,3-phenylene)bismaleimide and silica together. However, it has been confirmed that when compounding N,N'-(1,3-phenylene)bismaleimide, tan $\delta$ at 60° C. is not sufficiently lowered, and the rolling resistance becomes slightly high when being used in a tire tread.

Problems to be solved by the Invention

Recently, the inventors have discovered that when bismaleimide is compounded with rubber containing not less than 50% by weight of SBR together with silica, not only a heat resistance is improved but also a dynamic storage modulus (E') becomes higher and the steering stability is improved when such a rubber composition using bismaleimide is used in a tread.

However, when a greater amount of bismaleimide is compounded with SBR-containing rubber as mentioned above, vulcanization reaction is obstructed by bismaleimide and hence a long time is taken in the vulcanization and also a blow point (easiness of bubble generation in rubber) at the same vulcanizing degree becomes higher, so that it is necessary to take further longer vulcanization time in order to conduct the vulcanization without leaving bubbles in a rubber article, and the productivity largely lowers and becomes impracticable.

As regards this problem, it can naturally be considered to use an accelerator quickening the start-up of the vulcanization or so-called ultra-accelerator such as guanidines, dithiocarbamates and xanthates. However, these compounds can quicken the start-up of vulcanization to shorten a burning time (scorch time) of an uncured rubber, but fail to largely improve the blow point.

Therefore, the inventors have investigated a cause of obstructing the vulcanization reaction through bismaleimide and confirmed that a reaction between a vulcanization accelerator and a bismaleimide occurs earlier than the vulcanization reaction particularly in SBR compounded system and hence the vulcanization is obstructed are used. This is particularly more remarkable when thiazole-based and thiuram-based vulcanization accelerators are used. Further, it has been confirmed that a part of bismaleimide is decomposed and gasified due to the reaction between a bismaleimide and a vulcanization accelerator and hence an amount of gas larger than in a usual case is generated in rubber to degrade the blow point.

It is, therefore, an object of the invention to solve the above problems and to provide a technique capable of further improving a merit of bismaleimide for the increase in elasticity and avoiding a demerit of productivity due to the delay in vulcanization and to provide a rubber composition capable of providing a pneumatic tire with a remarkable non-slip effect, excellent wet-skid performances and a low rolling resistance on a wet road surface having an extremely low frictional coefficient.

Means for solving the Problems

In order to achieve the above object, the invention is constituted as follows.

The rubber composition according to the invention is characterized by comprising at least one rubber of natural rubber and synthetic diene rubbers as a rubber ingredient, at least one maleimide compound, and at least one nitrogen-containing compound selected from the group consisting of polyanilines, hydrazides and amine compounds. And also, the rubber composition is characterized by comprising at least one rubber of natural rubber and synthetic diene rubbers and at least one maleimide compound selected from the group consisting of bismaleimide, oligomers and polymers of bismaleimide.

Further, the pneumatic tire according to the invention uses the above rubber composition in its tread.

Embodiments of the Invention

The invention will be described in detail below.

In the invention can be used natural rubber and synthetic diene rubbers. As the synthetic diene rubber, mention may be made of cis-1,4-polyisoprene, styrene-butadiene copolymer, polybutadiene, low cis-1,4-polybutadiene, high cis-1,4-polybutadiene, ethylene-propylene-diene terpolymer, chloroprene, halogenated butyl rubber, acrylonitrile-butadiene rubber and so on. The natural rubber and synthetic diene rubbers may be used alone or in a blend thereof.

The natural rubber and at least one of cis-1,4-polyisoprene, styrene-butadiene copolymer and polybutadiene as the diene rubber are preferable because the improving effect by the combination with bismaleimide and hydrazide aiming at the invention is made clear.

And also, it is preferable that the remarkable effect is obtained when at least one of butadiene rubber (BR) and styrene-butadiene copolymer rubber (SBR) is included in the rubber ingredient in an amount of not less than 50% by weight. More preferably, the amount is not less than 80% by weight.

Heretofore, a maleimide compound is applied to a rubber composition containing, for example, natural rubber or isoprene rubber in an amount of not less than 50% by weight of the rubber ingredient. In this case, however, the tensile stress of full region becomes too high due to the compounding of maleimide and the object of the invention can not sufficiently be attained. And also, when butyl rubber is included in an amount of not less than 50% by weight, the increase of tensile stress in a desired region becomes small even in the compounding of the maleimide, so that the object of the invention can not be attained sufficiently likewise the above case.

Comparing BR and SBR with each other, SBR is preferable from a viewpoint of the establishment with dry gripping performance, and further the use of an emulsion polymerized SBR is preferable in view of wear resistance.

As the maleimide compounds used in the invention, a bismaleimide compound represented by the formula [7], or an oligomer or polymer of bismaleimide is preferable.

Moreover, when $R^9$ or $R^{20}$ in the general formula [7] of the bismaleimide compound is an alkylene group, if the carbon number is not less than 4, the molecular weight of the bismaleimide compound becomes large, so that the increasing effect of dynamic storage modulus aimed at the invention is not obtained at the compounding amount thereof.

As the bismaleimide compounds preferably usable in the invention, mention may be made of N,N'-(1,2-phenylene) bismaleimide, N,N'-(1,3-phenylene)bismaleimide, N,N'-(1, 4-phenylene) bismaleimide, N,N'-(4,4'-diphenylmethane) bismaleimide, 2,2-bis[4-(4-maleimidophenoxy)phenyl] propane, bis(3-ethyl,5-methyl-4-maleimidophenyl)methane and so on. One or more of them may be included in the rubber composition.

As the oligomer or polymer of bismaleimide preferably usable in the invention, mention may be made of (1) polybismaleimide oligomer or polymer obtained by simply oligomerizing or polymerizing bismaleimide, (2) polyaminobismaleimide oligomer or polymer obtained from bismaleimide and diamine, (3) bismaleimide triazine oligomer or polymer obtained from bismaleimide and dicyanate and so on.

And also, the maleimides as a starting material for bismaleimide oligomer or polymer may include N,N'-(1,2-phenylene)bismaleimide, N,N'-(1,3-phenylene) bismaleimide, N,N'-(1,4-phenylene)bismaleimide, 1,1'-(methylene-di-4,1-phenylene)bismaleimide and so on. One or more of them can be included.

Furthermore, the diamines as a starting material for polyamino bismaleimide oligomer or polymer may include p-phenylenediamine, m-phenylenediamine, bis(4-aminophenyl) methane, bis(4-aminophenyl) ether, bis(4-aminophenyl) sulphone, bis(4-aminophenyl) sulfide and so on. One or more of them can be included.

Moreover, the triazines as a starting material for the bismaleimide triazine oligomer or polymer or a starting material thereof may include cyanuric acid, monocyanate, dicyanate and so on.

In the invention, the oligomer or polymer of bismaleimide is favorable to have a softening point of not higher than 120° C. This is due to the fact that when the softening point exceeds 120° C., it tends to degrade the fracture properties of the rubber composition.

In the invention, the compounding amount of the maleimide compound is preferable to be 0.1–30 parts by weight per 100 parts by weight of the rubber ingredient. When it is less than 0.1 part by weight, the effect by the compounding may not sufficiently be obtained, while when it exceeds 30 parts by weight, it tends to degrade the fracture properties. From the similar viewpoint, the amount is preferably 0.5–10 parts by weight, more preferably 0.5–5.0 parts by weight, more particularly 0.5–3.0 parts by weight.

Particularly, in case of using N,N'-(4,4-diphenylmethane) bismaleimide, the compounding amount is preferable to be 0.5–4 parts by weight per 100 parts by weight of the rubber ingredient. When it is less than 0.5 part by weight, the improving effect of wet performances is not sufficient, while when it exceeds 4 parts by weight, the hardening of rubber tends to become severe and the cost becomes expensive.

The polyanilines preferably used in the invention includes bisanilines, aromatic polyanilines and the like. As the bisanilines, mention may be made of p-phenylenediamine, m-phenylenediamine, bis(4-aminophenyl) methane, bis(4-aminophenyl)ether, bis(3-aminophenyl) sulphone, bis(4-aminophenyl) sulphone, bis(4-aminophenyl) sulfide, 4,4'-(m-phenylene diisopropylidene) dianiline and so on. The aromatic polyanilines may include aromatic polyanilines represented by the general formula [1] and so on. One or more of them may be included in the rubber composition.

Moreover, when n is 0 or 1 in the polyanilines represented by the formula [1], the modulus of elasticity is not sufficiently improved. And also, the carbon number of $R^6$ is not particularly limited. Further, the possible range of 1 in the aromatic polyanilines represented by the formula [2] is an integer of 0 or more, preferably an integer of 0–80.

Further, the compounding amount of the polyanilines is preferable to be 10–200% by weight of the maleimide compound. When the amount is less than 10% by weight, the synergistic effect by the combination with the maleimide compound is not sufficiently obtained, while when it exceeds 200% by weight, the vulcanization is promoted and the rubber tends to be scorched. From the similar viewpoint, the amount is preferably 20–100% by weight.

As a compound represented by the formula [3] among hydrazides used in the invention, mention may be made of 1-hydroxy, N'-(1-methylethylidene)-2-naphthoic acid hydrazide, 1-hydroxy, N'-(1-methylpropylidene)-2-naphthoic acid hydrazide, 1-hydroxy, N'-(1-methylbutylidene)-2-naphthoic acid hydrazide, 1-hydroxy, N'-(1,3-dimethylbutylidene)-2-naphthoic acid hydrazide, 1-hydroxy, N'-(2,6-dimethyl-4-heptylidene)-2-naphthoic acid hydrazide, 1-hydroxy, N'-(2-furylmethylene)-2-naphthoic acid hydrazide, 3-hydroxy, N'-(1-methylethylidene)-2-naphthoic acid hydrazide, 3-hydroxy, N'-(1-methylpropylidene)-2-naphthoic acid hydrazide, 3-hydroxy, N'-(1-methylbutylidene)-2-naphthoic acid hydrazide, 3-hydroxy, N'-(1,3-dimethylbutylidene)-2-naphthoic acid hydrazide, 2-hydroxy, N'-(2,6-dimethyl-4-heptylidene)-3-naphthoic acid hydrazide, 2-hydroxy, N'-(2-furylmethylene)-3-naphthoic acid hydrazide, isophthalic acid di(1-methylethylidene) hydrazide, isophthalic acid di(1-methylpropylidene) hydrazide, isophthalic acid di(1-methylbutylidene) hydrazide, isophthalic acid di(1,3-dimethylbutylidene) hydrazide, isophthalic acid di(2,6-dimethyl-4-heptylidene) hydrazide, isophthalic acid di(2-furylmethylene) hydrazide, isonicotinic acid (1-methylethylidene) hydrazide, isonicotinic acid (1-methylpropylidene) hydrazide, isonicotinic acid (1-methylbutylidene) hydrazide, isonicotinic acid (2,6- dimethyl-4-heptylidene) hydrazide, isonicotinic acid (1,3-dimethylbutylidene) hydrazide, isonicotinic acid (2-furylmethylene) hydrazide, N'-(1-methylethylidene)-salicylic acid hydrazide, N'-(1-methylpropylidene)-salicylic acid hydrazide, N'-(1-methylbutylidene)-salicylic acid hydrazide, N'-(1,3-dimethylbutylidene)-salicylic acid hydrazide, N'-(2,6-dimethyl-4-heptylidene)-salicylic acid hydrazide, N'-(2-furylmethylene)-salicylic acid hydrazide, N'-(1-methylethylidene)-benzoic acid hydrazide, N'-(1-methylpropylidene)-benzoic acid hydrazide, N'-(1,3-dimethylbutylidene)-benzoic acid hydrazide, N'-(benzylidene)-benzoic acid hydrazide, N'-(4-dimethylaminophenylmethylene)-benzoic acid hydrazide, N'-(4-methoxyphenylmethylene)-benzoic acid hydrazide, N'-(4-hydroxyphenyl methylene)-benzoic acid hydrazide, N'-(1-phenylethylidene)-benzoic acid hydrazide, N'-(diphenylmethylene)-benzoic acid hydrazide, N'-[1-(2,4-dihydroxyphenyl) benzylidene]-benzoic acid hydrazide, N'-(2-furylmethylene)-benzoic acid hydrazide, N'-(1-methylethylidene)-1-naphthoic acid hydrazide, N'-(1-methylpropylidene)-1-naphthoic acid hydrazide, N'-(1,3-dimethylbutylidene)-1-naphthoic acid hydrazide, N'-(benzylidene)-1-naphthoic acid hydrazide, N'-(4-dimethylaminophenylmethylene)-1-naphthoic acid hydrazide, N'-(4-methoxyphenylmethylene)-1-naphthoic acid hydrazide, N'-(4-hydroxyphenyl methylene)-1-naphthoic acid hydrazide, N'-(1-phenylethylidene)-1-naphthoic acid hydrazide, N'-(diphenylmethylene)-1-naphthoic acid hydrazide, N'-(1-(2,4-dihydroxyphenyl) benzylidene)-1-naphthoic acid hydrazide, N'-(2-furylmethylene)-1-naphthoic acid hydrazide, N'-(1-methylethylidene)-2-naphthoic acid hydrazide, N'-(1-methylpropylidene)-2-naphthoic acid hydrazide, N'-(1,3-dimethylbutylidene)-2-naphthoic acid hydrazide, N'-(benzylidene)-2-naphthoic acid hydrazide, N'-(4-dimethylaminophenylmethylene)-2-naphthoic acid hydrazide, N'-(4-methoxyphenylmethylene)-2-naphthoic acid hydrazide, N'-(4-hydroxyphenylmethylene)-2-naphthoic acid hydrazide, N'-(1-phenylethylidene)-2-naphthoic acid hydrazide, N'-(diphenylmethylene)-2-naphthoic acid hydrazide, N'-[1-(2,4-dihydroxyphenyl) benzylidene]-2-naphthoic acid hydrazide, N'-(2-furylmethylene)-2-naphthoic acid hydrazide, N'-(1-methylethylidene)-propionic acid hydrazide, N'-(1-methylpropylidene) propionic acid hydrazide, N'-(1,3-dimethylbutylidene)-propionic acid hydrazide, N'-(benzylidene) propionic acid hydrazide, N'-(4-dimethylaminophenylmethylene)-propionic acid hydrazide, N'-(4-methoxyphenylmethylene) propionic acid hydrazide, N'-(4-hydroxyphenyl methylene)-propionic acid hydrazide, N'-(1-phenylethylidene)-propionic acid hydrazide, N'-(diphenylmethylene)-propionic acid hydrazide, N'-[1-(2,4-dihydroxyphenyl) benzylidene]-propionic acid hydrazide, N'-(2-furylmethylene)-propionic acid hydrazide, N'-(1-methylethylidene)-2-methyl-propionic acid hydrazide, N'-(1-methylpropylidene)-2-methyl-propionic acid hydrazide, N'-(1,3-dimethylbutylidene)-2-methyl-propionic acid hydrazide, N'-(benzylidene), 2-methyl-propionic acid hydrazide, N'-(4-dimethylaminophenylmethylene), 2-methyl-propionic acid hydrazide, N'-(4-methoxyphenylmethylene), 2-methyl-propionic acid hydrazide, N'-(4-hydroxyphenylmethylene), 2-methyl-propionic acid hydrazide, N'-(1-phenylethylidene), 2-methyl-propionic acid hydrazide, N'-(diphenylmethylene), 2-methyl-propionic acid hydrazide, N'-[1-(2,4-dihydroxy phenyl) benzylidene], 2-methyl-propionic acid hydrazide, N'-(2-furylmethylene), 2-methyl-propionic acid hydrazide, N'-(1-methylethylidene), 2,2-dimethyl-propionic acid hydrazide, N'-(1-methylpropylidene), 2,2-dimethyl-propionic acid hydrazide, N'-(1,3-dimethylbutylidene), 2,2-dimethyl propionic acid hydrazide, N'-(benzylidene), 2,2-dimethyl-propionic acid hydrazide, N'-(4-dimethylamino phenylmethylene), 2,2-dimethyl-propionic acid hydrazide, N'-(4-methoxyphenyl methylene), 2,2-dimethyl-propionic acid hydrazide, N'-(4-hydroxyphenyl methylene), 2,2-dimethyl-propionic acid hydrazide, N'-(1-phenylethylidene), 2,2-dimethyl-propionic acid hydrazide, N'-(diphenylmethylene), 2,2-dimethyl-propionic acid hydrazide, N'-[1-(2,4-dihydroxyphenyl) benzylidene], 2,2-dimethyl propionic acid hydrazide, N'-(2-furylmethylene), 2,2-dimethyl-propionic acid hydrazide and so on. One or more of them can be included in the rubber composition.

As a preferable hydrazide among them, there are 1-hydroxy, N'-(1-methylethylidene-2-naphthoic acid hydrazide, 1-hydroxy, N'-(1-methylpropylidene-2-naphthoic acid hydrazide, 1-hydroxy, N'-(1-methylbutylidene)-2-naphthoic acid hydrazide, 1-hydroxy, N'-(1,3-dimethylbutylidene)-2-naphthoic acid hydrazide, 1-hydroxy, N'-(2,6-dimethyl-4-heptylidene)-2-naphthoic acid hydrazide, 1-hydroxy-N'-(2-furylmethylene)-2-naphthoic acid hydrazide, 3-hydroxy, N'-(1-methylethylidene)-2-naphthoic acid hydrazide, 3-hydroxy, N'-(1-methylpropylidene)-2-naphthoic acid hydrazide, 3-hydroxy, N'-(1-methylbutylidene)-2-naphthoic acid hydrazide, 3-hydroxy, N'-(1,3-dimethylbutylidene)-2-naphthoic acid hydrazide, 2-hydroxy, N'-[2,6-dimethyl-4-heptylidene]-3-naphthoic acid hydrazide, 2-hydroxy, N'-(2-furylmethylene)-3-naphthoic acid hydrazide, isophthalic acid-di(1-methylethylidene) hydrazide, isophthalic acid-di (1-methylpropylidene) hydrazide, isophthalic acid-di(1-methylbutylidene) hydrazide, isophthalic acid-di(1,3-dimethylbutylidene) hydrazide, isophthalic acid-di(2,6-dimethyl-4-heptylidene) hydrazide, isophthalic acid-di(2-furylmethylene) hydrazide, isonicotinic acid-(1-methylethylidene) hydrazide, isonicotinic acid-(1-methylpropylidene) hydrazide, isonicotinic acid-(1-methylbutylidene) hydrazide, isonicotinic acid-(2,6-dimethyl-4-heptylidene) hydrazide, isonicotinic acid-(1,3-dimethylbutylidene) hydrazide, isonicotinic acid-(2-furylmethylene) hydrazide, N'-(1-methylethylidene)-salicylic acid hydrazide, N'-(1-methylpropylidene)-salicylic acid hydrazide, N'-(1-methylbutylidene)-salicylic acid hydrazide, N'-(1,3-dimethylbutylidene)-salicylic acid hydrazide, N'-(2,6-dimethyl-4-heptylidene)-salicylic acid hydrazide and N'-(2-furylmethylene)-salicylic acid hydrazide.

Moreover, when s in the formula [3] is not less than 4, the molecular weight of hydrazide becomes large and it is undesirably required to largely increase the compounding amount. When R' is outside the definition, the given effect is not sufficiently obtained.

As a compound represented by the formula [4] among the hydrazides used in the invention, mention may be made of semicarbazide, carbohydrazide, oxalic acid dihydrazide, malonic acid dihydrazide, succinic acid dihydrazide, glutaric acid dihydrazide, adipic acid dihydrazide, pimelic acid dihydrazide, suberic acid dihydrazide, azelaic acid dihydrazide, sebacic acid dihydrazide, 1,12-dodecane dicarboxylic acid dihydrazide, 1,16-hexadecane dicarboxylic acid dihydrazide, terephthalic acid dihydrazide, isophthalic acid dihydrazide, 2,6-naphthoic acid dihydrazide, 1,4-naphthoic acid dihydrazide, 2,6-pyridine dihydrazide, 4,4'-bisbenzene dihydrazide, salicylic acid hydrazide, p-hydroxy benzoic acid hydrazide, 1-hydroxy-2-naphthoic acid hydrazide, 2-hydroxy-3-naphthoic acid hydrazide, aminobenzoic acid hydrazide and so on. Among them, adipic acid dihydrazide, isophthalic acid dihydrazide, salicylic acid hydrazide and 2-hydroxy-3-naphthoic acid hydrazide are preferable. One or more of them can be included in the rubber composition.

Even in case of the formula [4] likewise the formula [3], when s is not less than 4, the molecular weight of hydrazide becomes large and it is undesirably required to largely increase the compounding amount, and when $R^1$ is outside the definition, the given effect is not sufficiently obtained.

Moreover, the compounding amount of hydrazide is preferable to be 5–200% by weight of the compounding amount of the maleimide compound. When the amount is less than 5% by weight, the synergistic effect by the combination with the maleimide compound is not obtained, while when it exceeds 200% by weight, vulcanization is promoted and the rubber tends to be scorched. From the similar viewpoint, the amount is preferably 10–100% by weight.

The amine compound used in the invention is as follows.

The specified alkyl group adoptable as $R^1$ in the formulae [5 and 6] for the amine and amine addition salt may be straight, branched or cyclic, and includes various octyl groups, various nonyl groups, various decyl groups, various dodecyl groups, various tetradecyl groups, various hexadecyl groups, various octadecyl groups, various behenyl groups, various octenyl groups, various decenyl groups, oleyl group, cyclooctyl group, cyclododecyl group, various cyclooctenyl groups, various cyclododecenyl groups and so on.

The specified aryl group adoptable as $R^{13}$ in the formulae [5 and 6] may have an adequate substituent such as straight, branched or cyclic lower alkyl group or the like on the aromatic ring, and includes phenyl group, various tolyl groups, various xylyl groups, α- or β-naphthyl group, various methylnaphthyl groups, various dimethylnaphthyl groups and so on.

The specified aralkyl group adoptable as $R^{13}$ in the formulae [5 and 6] may have an adequate substituent such as straight, branched or cyclic lower alkyl group or the like on the aromatic ring, and includes benzyl group, various methylbenzyl groups, phenethyl group, various methylphenethyl groups, various naphthylmethyl groups, various (methylnaphthyl)methyl groups and so on.

The specified alkyl group adoptable as $R^{14}$ and $R^{15}$ in the formulae [5 and 6] may be straight, branched or cyclic, and includes methyl group, ethyl group, n-propyl group, isopropyl group, various butyl groups, various pentyl groups, various hexyl groups, various octyl groups, various decyl groups, various dodecyl groups, propenyl group, allyl group, various pentenyl groups, various hexenyl groups, various octenyl groups, various decenyl groups, cyclopentyl group, cyclohexyl group, cyclooctyl group, various cyclopentenyl groups, various cyclohexenyl groups, various cyclooctenyl groups and so on.

The specified aryl group adoptable as $R^{14}$ and $R^{15}$ in the formulae [5 and 6] may have an adequate substituent such as straight, branched or cyclic lower alkyl group or the like on the aromatic ring, and includes phenyl group, various tolyl groups, various xylyl groups, α- or β-naphthyl group, various methylnaphthyl groups and so on.

The specified aralkyl group adoptable as $R^{14}$ and $R^{15}$ in the formulae [5 and 6] may have an adequate substituent such as a straight, a branched or a cyclic lower alkyl group or the like on the aromatic ring, and includes benzyl group, various methylbenzyl groups, phenethyl group, various methylphenethyl groups, various naphthylmethyl groups and so on.

On the other hand, the specified alkyl group adoptable as $R^{16}$ in the formulae [5 and 6] may be straight, branched or cyclic, and includes various hexyl groups, various octyl groups, various nonyl groups, various decyl groups, various dodecyl groups, various tetradecyl groups, various hexadecyl groups, various octadecyl groups, various behenyl groups, various hexenyl groups, various octenyl groups, various decenyl groups, oleyl group, cyclohexyl group, cyclooctyl group, cyclododecyl group, various cyclohexenyl groups, various cyclooctenyl groups, various cyclododecenyl groups and so on.

The specific aryl group and aralkyl group adoptable as $R^{16}$ in the formulae [5 and 6] may have an adequate substituent such as a straight, a branched or a cyclic lower alkyl group or the like on the aromatic ring, respectively, and may include the same ones as exemplified as the aryl group and aralkyl group in the above description for $R^{16}$.

As preferable amines constituting the amine and amine addition salt according to the invention, mention may be made of decylamine, laurylamine, myristylamine, palmitylamine, stearylamine, behenylamine, oleylamine, monomethyl decylamine, monomethyl laurylamine, monomethyl myristylamine, monomethyl palmitylamine, monomethyl stearylamine, monomethyl oleylamine, monoethyl decylamine, monoethyl laurylamine, monoethyl myristylamine, monoethyl palmitylamine, monoethyl stearylamine, monoethyl oleylamine, monopropyl decylamine, monopropyl laurylamine, monopropyl myristylamine, monopropyl palmitylamine, monopropyl stearylamine, monopropyl oleylamine, dimethyl decylamine, dimethyl laurylamine, dimethyl myristylamine, dimethyl palmitylamine, dimethyl stearylamine, dimethyl oleylamine, diethyl decylamine, diethyl laurylamine, diethyl myristylamine, diethyl palmitylamine, diethyl stearylamine, diethyl oleylamine, methylethyl decylamine, methylethyl laurylamine, methylethyl myristylamine, methylethyl palmitylamine, methylethyl stearylamine, methylethyl oleylamine, di(hydroxyethyl) decylamine, di(hydroxyethyl) laurylamine, di(hydroxyethyl) myristylamine, di(hydroxyethyl) palmitylamine, di(hydroxyethyl) stearylamine, di(hydroxyethyl) oleylamine and so on. Among them, tertiary alkyl amines in which each of $R^{14}$ and $R^{15}$ is a saturated or an unsaturated alkyl group having a carbon number of 1–8, respectively, and the total carbon number of $R^{13}$, $R^{14}$ and $R^{15}$ is 10–24 are particularly favorable.

On the other hand, as the carboxylic acid constituting the amine addition salt according to the invention, saturated or unsaturated straight chain aliphatic acids in which the carbon number of $R^{16}$ is 10–20 are preferable. As an example of this carboxylic acid, there are mentioned capric acid, lauric acid, myristic acid, palmitic acid, stearic acid, arachic acid, behenic acid, oleic acid and so on.

The amine addition salt according to the invention is preferable to have a molecular weight of 400–800.

Moreover, the amine addition salt may contain an inorganic salt such as a phosphate, a phosphite or the like in an amount of about 0.1–10% by weight of the amine addition salt for the purpose of increasing strength of flake or grain to prevent fusion likely caused at a high temperature in summer.

Further, the compounding amount of the amine compound is preferable to be 50–400% by weight of the maleimide compound. When the amount is less than 50% by weight, the synergistic effect by the combination with the maleimide compound is not obtained, while when it exceeds 400% by weight, vulcanization is promoted and the rubber tends to be scorched. From the similar viewpoint, the amount is preferably 100–200% by weight.

And also, the vulcanization accelerator usable in the invention is not particularly limited, but is preferably a benzothiazole-based vulcanization accelerator such as MBT (2-mercaptobenzothiazole), DM (dibenzothiazyl disulfide), CBS (N-cyclohexyl-2-benzothiazyl sulfeneamide), TBBS (N-t-butyl-2-benzothiazyl sulfeneamide), TBSI (N-t-butyl-2-benzothiazyl sulfeneimide) or the like; a guanidine-based vulcanization accelerator such as DPG (diphenyl guanidine) or the like; a thiuram-based vulcanization accelerator such as tetraoctyl thiuram disulfide, tetrabenzyl thiuram disulfide, tetramethyl thiuram disulfide, tetraisobutyl thiuram disulfide or the like; and a dithiocarbamate such as zinc dialkyldithiophosphate, zinc dibenzyldithiocarbamate or the like. Among them, DM, CBS, TBBS, tetraoctyl thiuram disulfide, and tetrabenzyl thiuram disulfide are preferable because they exhibit a stable vulcanization system.

When a vulcanization accelerator such as guanidine type such as DPG (diphenyl guanidine), or zinc dialkyldithiophosphate is used together with the above preferable vulcanization accelerator, it is favorable that the amount of thiazoles, thiurams and dithiocarbamates in the vulcanization accelerator is not less than 50% by weight because the rigidity at a low strain aiming at the invention is enhanced.

The amount of the vulcanization accelerator used is preferably 0.1–5 parts by weight, more particularly 0.2–3 parts by weight per 100 parts by weight of the rubber ingredient.

The invention is considerably effective for a rubber composition containing a thiazole based vulcanization accelerator and/or a thiuram based vulcanization accelerator as well as a tire.

In the invention, at least one of silica, carbon black, calcium carbonate, titanium oxide and the like may be used as a reinforcing filler. Among them, silica and carbon black are preferable.

The compounding amount of the reinforcing filler is preferably 20–150 parts by weight per 100 parts by weight of the rubber ingredient. When the amount is less than 20 parts by weight, the fracture properties and wear resistance of the vulcanizate are insufficient, while when it exceeds 150 parts by weight, the workability is not favorable. From the similar viewpoint, it is more preferably 25–80 parts by weight.

And also, the invention is effective when silica is compounded in an amount of 5–60 parts by weight per 100 parts by weight of the rubber ingredient. When the compounding amount of silica is less than 5 parts by weight, it tends to lower the dry gripping performance, while when it exceeds 60 parts by weight, it tends to degrade the workability.

As the carbon black used as the reinforcing filler, there are mentioned HAF, ISAF, SAF and so on.

As silica, precipitated silica is preferably used. Particularly, it has a nitrogen adsorption specific surface area ($N_2SA$) of 100 to 300 $m^2/g$, preferably 100 to 250 $m^2/g$.

And also, when carbon black and silica are used together, the compounding ratio may arbitrarily be varied in accordance with the compounding purpose.

In addition to the above rubber ingredient, reinforcing filler, bismaleimide and hydrazide, the rubber composition according to the invention may be compounded with a silane coupling agent, vulcanizing agent, vulcanization accelerator, accelerator activator, antioxidant, antiozonant, age resistor, process oil, zinc white (ZnO), stearic acid and the like, which are usually used in the rubber industry, if necessary.

As the vulcanizing agent usable in the invention is mentioned, for example, sulfur and the like. The amount used is 0.1–10 parts by weight, preferably 0.5–5.0 parts by weight as a sulfur content per 100 parts by weight of the rubber ingredient. When the amount is less than 0.1 part by weight, the fracture properties and wear resistance of the vulcanized rubber tend to be degraded, while when it exceeds 10 parts by weight, the rubber elasticity tends to be lost.

In order to ensure an adequate tensile stress, sulfur is compounded in an amount of not less than 1.0 part by weight, more preferably not less than 1.2 parts by weight but not more than 8 parts by weight. When it exceeds 8 parts by weight, there may be problems such that sulfur blooms onto a rubber surface, and the like.

Furthermore, the compounding amount of the vulcanization accelerator including thiazoles, thiurams and dithiocarbamates is not more than 2 times of the compounding weight of sulfur on the total weight. When the vulcanization accelerator is compounded in excess of this amount, the tensile stress at a large deformation increases and hence the sufficient improvement of wet-skid properties aiming at the invention is not obtained.

It is also an essential feature of the invention that the crosslinking system is a sulfur crosslinking system with a specific range. For example, the object of the invention can not be attained by crosslinking using an organic peroxide or a resin.

As the process oil usable in the invention, mention may be made of paraffinic, naphthenic and aromatic ones. The aromatic oils are preferably used in applications regarding the fracture properties and wear resistance as importance, and the naphthenic or paraffinic oils are preferably used in applications regarding the low heat build-up and low temperature properties as importance. The amount used is preferably not more than 100 parts by weight per 100 parts by weight of the rubber ingredient. When it exceeds 100 parts by weight, it tends to degrade the fracture properties and low heat build-up property of the vulcanized rubber.

A preferable embodiment of the invention is a rubber composition comprising 100 parts by weight of the rubber ingredient, 5–60 parts by weight of silica and 0.5–4 parts by weight of N,N'-(1,3-phenylene) bismaleimide.

When the compounding amount of N,N'-(1,3-phenylene) bismaleimide is less than 0.5 part by weight, the wet performances are not sufficiently improved, while when it exceeds 4 parts by weight, the hardening tends to become vigorous and the cost becomes undesirably expensive.

Another preferable embodiment of the invention is a rubber composition compounding 0.5–4 parts by weight of N,N'-(4,4'-diphenylmethane) bismaleimide and silica with 100 parts by weight of rubber ingredient containing not less than 50% by weight of at least one diene rubber of butadiene rubber and styrene-butadiene copolymer rubber.

When the compounding amount of N,N'-(4,4'-diphenylmethane) bismaleimide is less than 0.5 part by weight, the wet performances are not improved, while when it exceeds 4 parts by weight, the hardening of the rubber becomes vigorous and the cost becomes undesirably expensive.

Further, the dynamic storage modulus (E') of the rubber composition is preferable to be 7.0–16.0 MPa. When it is less than 7.0 MPa, the rigidity by feeling is insufficient, while when it exceeds 16.0 MPa, the ride comfort tends to be degraded. Similarly, the tensile stress at 300% elongation ($M_{300}$) is preferable to be 7.0–15.0 MPa. When it is less than 7.0 MPa, the rigidity by feeling is insufficient, while when it exceeds 15.0 MPa, the ride comfort tends to be degraded.

When the rubber composition according to the invention having the excellent properties as mentioned above is applied to a tread, since distribution of ground contact pressure of a tire can be uniformized, it largely contributes to the improvement of wet-skid performances.

In the pneumatic tire according to the invention, the above rubber composition is applied to the tread rubber. The structure of the tread is not particularly limited, and the rubber composition can be applied to one-layer structure comprising one tread rubber layer, a two-layer structure comprising cap rubber layer/base rubber layer, and further a multilayer structure. In any case, it is effective to arrange the rubber composition according to the invention at a ground contact side.

The rubber composition according to the invention is obtained by kneading the rubber ingredient, the maleimide compound, the nitrogen-containing compound, the reinforcing filler and the like described above by using a kneading machine such as rolls, internal mixer or the like, and vulcanizing after the forming. The rubber composition according to the invention can be suitably used in tire applications as a rubber member such as tire tread, under tread, carcass, sidewall, bead portion or the like as well as applications such as rubber vibration isolator, belt, hose and other industrial articles.

When the rubber composition according to the invention having the excellent properties as mentioned above is applied to a tread rubber of a pneumatic tire, since the distribution of ground contact pressure of the tire can be uniformized in addition to the aforementioned effects, the wet-skid performances are remarkably improved.

EXAMPLE

The invention will be described more concretely below.
<Physical Properties of Rubber Composition>

Various compounding ingredients as shown in Tables 1 to 22 are kneaded and compounded with a laboratory plastomill of 500 ml and 3-inch rolls to obtain uncured rubber compositions, respectively. With respect to each rubber composition, a curelasto test and a blow point test are carried out by the following methods (1) and (2).

And also, the tensile test, dynamic viscoelasticity test and hardness measurement after the vulcanization of each rubber composition are carried out by the following methods (3) and (4).

(1) Curelasto Test

The measurement is carried out at 145° C. by using MDR2000 made by Flexis Inc. of U.S.A.

$M_H$ and $M_L$ are maximum and minimum values of torque, respectively, and $T_{10}$, $T_{90}$ are times at which the rise of torque through vulcanization reaction reaches 10% and 90% of the total charge, respectively. Various data are represented by an index on the basis that Comparative Example 1 concerning the system compounded with carbon black as a filler, Comparative Example 3 concerning the system compounded with carbon black and silica as a filler, Comparative Example 6 concerning the system compounded with a large amount of silica as a filler and Comparative Example 8 concerning the system compounded with a large amount of carbon black as a filler are set to 100, respectively. As for the $T_{10}$ and $T_{90}$, the nearer the indices to 100, the better the workability.

(2) Blow Point Test

Various data measured at 170° C. under an activation energy of 20 kcal using a blow point measuring apparatus made by Toyo Seiki Co., Ltd. are represented by an index on the basis that Comparative Example 1 concerning the system compounded with carbon black as a filler, Comparative Example 3 concerning the system compounded with carbon black and silica as a filler, Comparative Example 6 concerning the system compounded with a large amount of silica as a filler and Comparative Example 8 concerning the system compounded with a large amount of carbon black as a filler are set to 100, respectively. The larger the index value, the larger the blow point value, and longer vulcanization time is required and hence the productivity is degraded.

(3) Tensile Test

After vulcanization at 145° C. for a period corresponding to 1.5 times the $T_{90}$ obtained in the test (1), the tensile test is carried out according to JIS K 6301–1975 (using a No. 3 test piece) to measure an elongation at break ($E_B$), strength at break ($T_B$) and modulus at 300% elongation ($M_{300}$). Various data are represented by an index on the basis that Comparative Example 1 concerning the system compounded with carbon black as a filler, Comparative Example 3 concerning the system compounded with carbon black and silica as a filler, Comparative Example 6 concerning the system compounded with a large amount of silica as a filler and Comparative Example 8 concerning the system compounded with a large amount of carbon black as a filler are set to 100, respectively. The larger the index value, the better the fracture properties of the rubber composition.

(4) Dynamic Viscoelasticity Test

There are measured E' (dynamic storage modulus), E" (dynamic loss modulus) and tan δ (loss factor) at a frequency of 52 Hz, a measuring temperature of 30° C. and a strain of 1% by using a spectrometer (dynamic viscoelasticity measuring tester) made by Toyo Seiki Co., Ltd. Various data are represented by an index on the basis that Comparative Example 1 concerning the system compounded with carbon black as a filler, Comparative Example 3 concerning the system compounded with carbon black and silica as a filler, Comparative Example 6 concerning the system compounded with a large amount of silica as a filler and Comparative Example 8 concerning the system compounded with a large amount of carbon black as a filler are set to 100, respectively.

(5) Hardness

The measurement is conducted according to a hardness test (type A), JIS K6301-1975.
<Performances of a Pneumatic Tire>

Pneumatic tires of Embodiments 1 to 6 having a tire size of 185/70R14 and a tread of one-layer structure and pneumatic tires of Embodiment 7 having a tire size of 175/65R14 and a tread of one-layer structure are prepared according to conventional manner by using one of rubber compositions of Examples 2, 5, 7, 11, 12, 13, 14, 15, 19, 20, 21, 27, 28, 30, 31, 32, 33, 35, 37, 43, 44, 47, 49, 55, 56, 58, 59, 60, 61, 63, 65, 66, 67, 68, 69, 70, 71, 72, 73, 74, 75, 78, 81, 82, 84, 85, 86 and 87 and Comparative Examples 1, 3, 4, 6 and 8 as a tread rubber. The steering performance (maneuverability) on a wet road surface with respect to these tires is evaluated by an actual running test.

(1) Maneuverability On Wet Road Surface

On a test course wetted by sprinkling water is actually run a vehicle of an FF 4-door sedan provided with each new tire, during which the driving performance, braking performance, steering responsibility and steering controllability are totally evaluated by a test driver while using the tire of Comparative Example 1, 6 or 8 as a control tire.

+1: a case that the professional test driver feels good to an extent of delicate recognition as compared to the control tire;

+2: a case that the professional test driver feels good to an extent of clear recognition as compared to the control tire;

+3: a case that a skilled driver among ordinary drivers feels good to an extent of recognition as compared to the control tire;

+4: a case that an ordinary driver feels good to an extent of recognition as compared to the control tire.

Further, the similar tire as mentioned above is prepared by using one of the rubber compositions of Examples 15, 19, 20, 21, 28, 32, 66, 71, 78, 81 and 82 and Comparative Examples 3, 4 and 6 as a tread rubber, and the performances of these tires are evaluated by a drum test according to the following method.

(2) Rolling Resistance

After each tire is inflated under an internal pressure of 1.7 kg/cm$^2$, it is run on a large-size testing drum at a speed of 80 km/h for a given time under a load of 395 kg, and then run by inertia by cutting the driving force of the drum off, during which the rolling resistance is measured from the deceleration rate of the tire and represented by an index on the basis that the evaluated value in the tire of Comparative Example 1, 6 or 8 as a control tire is set to 100. The larger the index value, the lower the rolling resistance and the better the result.

Embodiment 1

In this embodiment, the effect of compounding a maleimide compound and the effect of further compounding a polyaniline are examined with respect to rubber compositions having a basic formulation of Table 1 and prepared according to Table 2 or Table 3. The results are shown in Table 2 and Table 3.

TABLE 1

|  | Parts by weight |
|---|---|
| Rubber ingredient *1 | 100 |
| Carbon black *2 | Variable |
| Silica *3 | Variable |
| Silane coupling agent *4 | Variable |
| Aromatic oil | 30 |
| Stearic acid | 2 |
| Zinc white | 3 |
| Antioxidant *5 | 1 |
| Vulcanization accelerator *6 | Variable |
| Vulcanization accelerator *7 | 1 |
| Sulfur | 1.75 |
| Bismaleimide *8 | Variable |
| Polyaniline A, B, C or D *9 | Variable |

*1 SBR1500 (Trademark: made by JSR Corporation)
*2 Seast 3H (Trademark: ISAF made by Tokai Carbon Co., Ltd.)
*3 Nipsil AQ (Trademark: made by Nippon Silica Kogyo Co., Ltd.)
*4 Si 69 (Trademark: made by Degussa AG of German)
*5 Noclac 6C (Trademark: made by Ohuchi Shinko Kagaku Kogyo Co., Ltd.)
*6 Nocceler D (Trademark: made by Ohuchi Shinko Kagaku Kogyo Co., Ltd.)
*7 Nocceler NS (Trademark: made by Ohuchi Shinko Kagaku Kogyo Co., Ltd.)
*8 N,N'-(4,4'-diphenylmethane)bismaleimide
*9A ANILIX (Trademark: made by Mitsui Chemicals Fine, Inc.)
*9B 4,4'-(m-phenylenediisopropylidene)dianiline
*9C bis-3-aminophenyl sulphone

TABLE 2

(Compounding unit: parts by weight)

| Batch No. | Comparative Example 1 | Example 1 | Example 2 | Example 3 | Comparative Example 2 | Example 4 | Example 5 | Example 6 | Example 7 | Example 8 | Example 9 | Example 10 |
|---|---|---|---|---|---|---|---|---|---|---|---|---|
| Formulation (ingredients in Table 1, the amount of which is variable) | | | | | | | | | | | | |
| Carbon black ISAF | 65.0 | 65.0 | 65.0 | 65.0 | 65.0 | 65.0 | 65.0 | 65.0 | 65.0 | 65.0 | 65.0 | 65.0 |
| Silica | | | | | | | | | | | | |
| Si 69 | | | | | | | | | | | | |
| Nocceler D | 0.3 | 0.3 | 0.3 | 0.3 | 0.3 | 0.3 | 0.3 | 0.3 | 0.3 | 0.3 | 0.3 | 0.3 |
| Bismaleimide | | 1.0 | 2.0 | 4.0 | | 1.0 | 1.0 | 1.0 | 2.0 | 4.0 | 2.0 | 2.0 |
| Polyaniline A | | | | | 2.0 | 0.5 | 1.0 | 2.0 | 1.0 | 2.0 | | |
| Polyaniline B | | | | | | | | | | | 1.0 | |
| Polyaniline C | | | | | | | | | | | | 1.0 |
| Curelasto test | | | | | | | | | | | | |
| $M_L$ | 100 | 100 | 100 | 102 | 101 | 101 | 102 | 102 | 101 | 102 | 98 | 104 |
| $M_H$ | 100 | 110 | 115 | 123 | 99 | 113 | 115 | 120 | 121 | 128 | 119 | 125 |
| $T_{10}$ | 100 | 103 | 107 | 115 | 85 | 99 | 95 | 89 | 99 | 95 | 102 | 89 |
| $T_{90}$ | 100 | 125 | 149 | 163 | 90 | 110 | 102 | 96 | 112 | 108 | 115 | 98 |
| Blow point test | 100 | 131 | 156 | 188 | 99 | 101 | 97 | 92 | 102 | 99 | 103 | 95 |
| Tensile test | | | | | | | | | | | | |
| EB | 100.0 | 104.5 | 110.8 | 113.4 | 98.0 | 105.0 | 103.0 | 99.0 | 106.5 | 108.0 | 108.2 | 105.2 |
| TB | 100.0 | 103.0 | 107.2 | 105.2 | 99.0 | 101.0 | 98.0 | 97.0 | 103.2 | 104.0 | 104.2 | 98.5 |
| $M_{300}$ | 100.0 | 98.1 | 94.9 | 89.0 | 104.0 | 100.0 | 101.3 | 104.0 | 100.4 | 102.1 | 98.3 | 102.5 |

TABLE 2-continued (Compounding unit: parts by weight)

| Batch No. | Comparative Example 1 | Example 1 | Example 2 | Example 3 | Comparative Example 2 | Example 4 | Example 5 | Example 6 | Example 7 | Example 8 | Example 9 | Example 10 |
|---|---|---|---|---|---|---|---|---|---|---|---|---|
| Dynamic viscoelasticity test | | | | | | | | | | | | |
| E' | 100.0 | 125.6 | 133.9 | 145.0 | 105.0 | 130.5 | 134.5 | 142.3 | 140.2 | 156.3 | 139.7 | 143.5 |
| E" | 100.0 | 122.1 | 118.4 | 125.0 | 115.5 | 126.0 | 117.0 | 122.4 | 122.4 | 133.4 | 123.7 | 121.0 |
| tan δ | 100.0 | 97.2 | 88.4 | 86.2 | 110.0 | 96.5 | 87.0 | 86.0 | 87.3 | 85.3 | 88.5 | 84.3 |
| Tire performances | | | | | | | | | | | | |
| Maneuverability | Control | | +2 | | | +2 | | | +3 | | | |

TABLE 3

(Compounding unit: parts by weight)

| Batch No. | Comparative Example 3 | Example 11 | Example 12 | Example 13 | Example 14 |
|---|---|---|---|---|---|
| Formulation (ingredients in Table 1, the amount of which is variable) | | | | | |
| Carbon black ISAF | 35.0 | 35.0 | 35.0 | 35.0 | 35.0 |
| Silica | 30.0 | 30.0 | 30.0 | 30.0 | 30.0 |
| Si 69 | 3.0 | 3.0 | 3.0 | 3.0 | 3.0 |
| Nocceler D | 0.6 | 0.6 | 0.6 | 0.6 | 0.6 |
| Bismaleimide | | 2.0 | 1.0 | 2.0 | 2.0 |
| Polyaniline A | | | 0.5 | 0.5 | 1.0 |
| Polyaniline B | | | | | |
| Polyaniline C | | | | | |
| Curelasto test | | | | | |
| $M_L$ | 100 | 100 | 100 | 102 | 103 |
| $M_H$ | 100 | 108 | 106 | 109 | 112 |
| $T_{10}$ | 100 | 106 | 101 | 103 | 97 |
| $T_{90}$ | 100 | 172 | 101 | 102 | 99 |
| Blow point test | 100 | 196 | 101 | 98 | 86 |
| Tensile test | | | | | |
| EB | 100.0 | 103.9 | 98.0 | 99.0 | 97.2 |
| TB | 100.0 | 94.6 | 96.0 | 94.2 | 95.6 |
| $M_{300}$ | 100.0 | 93.1 | 102.0 | 104.0 | 105.6 |
| Dynamic viscoelasticity test | | | | | |
| E' | 100.0 | 146.3 | 138.2 | 154.2 | 164.3 |
| E" | 100.0 | 136.1 | 127.9 | 140.4 | 147.9 |
| tan δ | 100.0 | 93.0 | 92.5 | 91.0 | 90.0 |
| Tire performances | | | | | |
| Maneuverability | Control | +2 | +2 | +3 | +3 |

As seen from the above results, Comparative Example 2 using the polyaniline A alone is unfavorable because the blow point is similar to that of the control although $T_{90}$ is shortened and although E' raises slightly, tan δ considerably increases.

On the contrary, E' is increased by not less than 20% in Examples 1 to 3 using bismaleimide alone. Further, the delay of vulcanization is improved and the blow point is largely improved in Examples 4 to 10 using bismaleimide and polyaniline together. And also, E' largely rises and tan δ tends to lower as compared with the case using bismaleimide alone.

Furthermore, the similar synergistic effect is exhibited by using a bismaleimide and a polyaniline together even in the system using carbon black and silica together as shown in Comparative Example 3 and Examples 11 to 14.

According to this embodiment, there can be provided a rubber composition suitable for a tread rubber or the like having a high workability, a good productivity and a high modulus of elasticity. And also, a pneumatic tire using such a rubber composition in a tread is excellent in the maneuverability.

Embodiment 2

In this embodiment, the effect of compounding a maleimide compound and the effect of further compounding a hydrazide are examined with respect to rubber compositions having a basic formulation of Table 4 and prepared according to Table 5 to Table 7. The results are shown in Table 5 to Table 7.

TABLE 4

| | Parts by weight |
|---|---|
| Rubber ingredient [1] | 100 |
| Carbon black [2] | Variable |
| Silica [3] | Variable |
| Silane Coupling agent [4] | Variable |
| Aromatic Oil | 30 |
| Stearic acid | 2 |
| Zinc White | 3 |
| Antioxidant [5] | 1 |
| Vulcanization accelerator [6] | Variable |
| Vulcanization accelerator [7] | 1 |
| Sulfur | 1.75 |
| Bismaleimide [8] | Variable |
| Hydrazide A, B, or C [9] | Variable |

[1] SBR1500 (Trademark: made by JSR Corporation)
[2] Seast 3H (Trademark: ISAF made by Tokai Carbon Co., Ltd.)
[3] Nipsil AQ (Trademark: made by Nippon Silica Kogyo Co., Ltd.)
[4] Si 69 (Trademark: made by Degussa AG of German)
[5] Noclac 6C (Trademark: made by Ohuchi Shinko Kagaku Kogyo Co., Ltd.)
[6] Nocceler D (Trademark: made by Ohuchi Shinko Kagaku Kogyo Co., Ltd.)
[7] Nocceler NS (Trademark: made by Ohuchi Shinko Kagaku Kogyo Co., Ltd.)
[8] N,N'-(4,4'-diphenylmethane)bismaleimide
[9]A 3-hydroxy, N'-(1,3-dimethylbutylidene)-2-naphthoic acid hydrazide
[9]B N'-(1,3-dimethylbutylidene)-salicylic acid hydrazide
[9]C isophthalic acid di(1,3-dimethylbutylidene)hydrazide
[9]D isonicotinic acid(1,3-dimethylbutylidene)hydrazide

TABLE 5

(Compounding unit: parts by weight)

| Batch No. | Comparative Example 4 | Example 15 | Example 16 | Example 17 | Comparative Example 5 | Example 18 | Example 19 | Example 20 | Example 21 | Example 22 | Example 23 | Example 24 | Example 25 | Example 26 |
|---|---|---|---|---|---|---|---|---|---|---|---|---|---|---|
| Formulation (ingredients in Table 4, the amount of which is variable) | | | | | | | | | | | | | | |
| Carbon black ISAF | 60.0 | 60.0 | 60.0 | 60.0 | 60.0 | 60.0 | 60.0 | 60.0 | 60.0 | 60.0 | 60.0 | 60.0 | 60.0 | 60.0 |
| Silica | | | | | | | | | | | | | | |
| Si 69 | | | | | | | | | | | | | | |
| Nocceler D | 0.3 | 0.3 | 0.3 | 0.3 | 0.3 | 0.3 | 0.3 | 0.3 | 0.3 | 0.3 | 0.3 | 0.3 | 0.3 | 0.3 |
| Bismaleimide | | 1.0 | 2.0 | 4.0 | | 1.0 | 1.0 | 1.0 | 2.0 | 4.0 | 1.0 | 1.0 | 1.0 | 1.0 |
| Polyaniline A | | | | | 1.0 | 0.25 | 0.5 | 1.0 | 0.5 | 1.0 | | | | |
| Polyaniline B | | | | | | | | | | | 0.5 | 1.0 | | |
| Polyaniline C | | | | | | | | | | | | | 0.5 | |
| Polyaniline D | | | | | | | | | | | | | | 0.5 |
| Curelasto test | | | | | | | | | | | | | | |
| $M_L$ | 100 | 100 | 100 | 102 | 101 | 100 | 101 | 101 | 100 | 102 | 98 | 104 | 101 | 102 |
| $M_H$ | 100 | 110 | 115 | 123 | 100 | 113 | 117 | 123 | 121 | 131 | 119 | 125 | 112 | 114 |
| $T_{10}$ | 100 | 103 | 107 | 115 | 95 | 101 | 99 | 96 | 99 | 96 | 102 | 89 | 98 | 94 |
| $T_{90}$ | 100 | 125 | 149 | 163 | 92 | 107 | 103 | 99 | 110 | 106 | 115 | 98 | 102 | 96 |
| Blow point test | 100 | 131 | 156 | 188 | 102 | 105 | 98 | 97 | 101 | 99 | 103 | 95 | 97 | 95 |
| Tensile test | | | | | | | | | | | | | | |
| EB | 100.0 | 104.5 | 110.8 | 113.4 | 96.5 | 99.1 | 96.5 | 93.8 | 98.5 | 101.0 | 98.3 | 98.9 | 96.4 | 93.1 |
| TB | 100.0 | 103.0 | 107.2 | 105.2 | 99.0 | 101.0 | 98.0 | 97.3 | 97.5 | 100.4 | 99.5 | 102.0 | 98.9 | 99.5 |
| $M_{300}$ | 100.0 | 98.1 | 94.9 | 89.0 | 105.0 | 100.0 | 103.5 | 105.7 | 105.2 | 105.8 | 101.5 | 104.2 | 103.4 | 106.2 |
| Dynamic viscoelasticity test | | | | | | | | | | | | | | |
| E' | 100.0 | 125.6 | 133.9 | 145.0 | 102.0 | 130.3 | 135.2 | 142.3 | 141.3 | 155.4 | 132.5 | 138.5 | 130.2 | 136.2 |
| tan δ | 100.0 | 97.2 | 88.4 | 86.2 | 87.2 | 93.4 | 86.8 | 82.5 | 86.9 | 84.1 | 90.2 | 87.1 | 85.1 | 96.1 |
| Tire performances | | | | | | | | | | | | | | |
| Maneuverability | Control | +1 | | | | | +2 | +3 | +3 | | | | | |
| Rolling resistance | 100 | 100 | | | | | 103 | 105 | 103 | | | | | |

TABLE 6

(Compounding unit: parts by weight)

| Batch No. | Comparative Example 3 | Example 11 | Example 27 | Example 28 | Example 29 |
|---|---|---|---|---|---|
| Formulation (ingredients in Table 4, the amount of which is variable) | | | | | |
| Carbon black ISAF | 35.0 | 35.0 | 35.0 | 35.0 | 35.0 |
| Silica | 30.0 | 30.0 | 30.0 | 30.0 | 30.0 |
| Si 69 | 3.0 | 3.0 | 3.0 | 3.0 | 3.0 |
| Nocceler D | 0.6 | 0.6 | 0.6 | 0.6 | 0.6 |
| Bismaleimide | | 2.0 | 1.0 | 2.0 | 2.0 |
| Hydrazide A | | | 0.5 | 0.5 | 1.0 |
| Curelasto test | | | | | |
| $M_L$ | 100 | 100 | 100 | 102 | 103 |
| $M_H$ | 100 | 108 | 107 | 110 | 111 |
| $T_{10}$ | 100 | 106 | 100 | 102 | 97 |
| $T_{90}$ | 100 | 172 | 101 | 104 | 99 |
| Blow point test | 100 | 196 | 104 | 106 | 100 |
| Tensile test | | | | | |
| EB | 100.0 | 103.9 | 96.5 | 95.6 | 96.5 |
| TB | 100.0 | 94.6 | 99.5 | 100.6 | 99.8 |
| $M_{300}$ | 100.0 | 93.1 | 99.8 | 97.3 | 98.7 |
| E' | 100.0 | 146.3 | 138.2 | 156.2 | 168.2 |
| tan δ | 100.0 | 93.0 | 87.5 | 86.5 | 82.1 |
| Tire performances | | | | | |
| Maneuverability | Control | 2 | 2 | 3 | |
| Rolling resistance | 100 | | | 104 | |

TABLE 7

(Compounding unit: parts by weight)

| Batch No. | Comparative Example 6 | Example 30 | Example 31 | Example 32 | Example 33 |
|---|---|---|---|---|---|
| Formulation (ingredients in Table 4, the amount of which is variable) | | | | | |
| Carbon black ISAF | 5.0 | 5.0 | 5.0 | 5.0 | 5.0 |
| Silica | 60.0 | 60.0 | 60.0 | 60.0 | 60.0 |
| Si 69 | 6.0 | 6.0 | 6.0 | 6.0 | 6.0 |
| Nocceler D | 0.9 | 0.9 | 0.9 | 0.9 | 0.9 |
| Bismaleimide | | 2.0 | 1.0 | 2.0 | 2.0 |
| Hydrazide A | | | 0.5 | 0.5 | 1.0 |
| Curelasto test | | | | | |
| $M_L$ | 100 | 93 | 100 | 104 | 103 |
| $M_H$ | 100 | 97 | 100 | 102 | 103 |
| $T_{10}$ | 100 | 106 | 102 | 104 | 105 |
| $T_{90}$ | 100 | 158 | 98 | 98 | 100 |
| Blow point test | 100 | 178 | 108 | 105 | 102 |
| Tensile test | | | | | |
| EB | 100.0 | 107.9 | 101.0 | 99.5 | 96.3 |
| TB | 100.0 | 98.2 | 99.0 | 97.0 | 95.0 |
| $M_{300}$ | 100.0 | 85.8 | 99.0 | 101.0 | 102.0 |
| E' | 100.0 | 144.5 | 135.0 | 148.0 | 162.0 |
| tan δ | 100.0 | 102.0 | 97.0 | 92.0 | 88.0 |
| Tire performances | | | | | |
| Maneuverability | Control | 2 | 1 | 2 | 4 |
| Rolling resistance | 100 | | | 103 | |

As seen from the above results, in Comparative Example 5 using hydrazide A alone, although $T_{90}$, is slightly short as compared to Comparative Example 1, the blow point is equal to that of the control and E' is not substantially increased.

On the contrary, in Examples 15 to 17 using bismaleimide alone, E' is increased by not less than 20%, and in Examples 18~26 using bismaleimide and hydrazide together, the delay of vulcanization is improved and the blow point is remarkably improved.

Furthermore, it can be seen that E' is considerably increased by compounding a hydrazide as compared with the case using bismaleimide alone and there is a synergistic effect by a combination of these two compounds.

Further, it can be seen that when the rubber compositions of Examples 19, 20, 21 are used in a tread, the wet maneuverability is improved and the rolling resistance value is decreased as compared to Comparative Example 4, whereby a higher maneuverability and a low fuel consumption can simultaneously be established.

Moreover, it can be seen that the similar synergistic effect is exhibited by using a bismaleimide and a hydrazide together even in the system using carbon black and silica together as shown in Comparative Example 3, Example 11 and Examples 27 to 29 and the system using a large amount of silica as shown in Comparative Example 6 and Examples 30 to 33.

According to this embodiment, there can be provided a rubber composition suitable as a tread rubber or the like having a high workability, a good productivity, a high elasticity and a low heat build-up. And also, a pneumatic tire using such a rubber in a tread is excellent in the maneuverability and low fuel consumption.

Embodiment 3

In this embodiment, the effect of compounding a maleimide compound and the effect of further compounding a hydrazide of a type different from that of Embodiment 2 are examined with respect to rubber compositions having a basic formulation of Table 8 and prepared according to Table 9 or Table 10. The results are shown in Table 9 and Table 10.

TABLE 8

| | Parts by weight |
|---|---|
| Rubber Ingredient [*1] | 100 |
| Carbon Black [*2] | Variable |
| Silica [*3] | Variable |
| Silane Coupling agent [*4] | Variable |
| Aromatic Oil | 30 |
| Stearic acid | 2 |
| Zinc White | 3 |
| Antioxidant [*5] | 1 |
| Vulcanization accelerator [*6] | Variable |
| Vulcanization accelerator [*7] | 1 |
| Sulfur | 1.75 |
| Bismaleimide [*8] | Variable |
| Hydrazide E, F, G or H [*9] | Variable |

[*1] SBR1500 (Trademark: made by JSR Corporation)
[*2] Seast 3H (Trademark: ISAF made by Tokai Carbon Co., Ltd. ISAF)
[*3] Nipsil AQ (Trademark: made by Nippon Silica Kogyo Co., Ltd.)
[*4] Si 69 (Trademark: made by Degussa AG of German)
[*5] Noclac 6C (Trademark: made by Ohuchi Shinko Kagaku Kogyo Co., Ltd.)
[*6] Nocceler D (Trademark: made by Ohuchi Shinko Kagaku Kogyo Co., Ltd.)
[*7] Nocceler NS (Trademark: made by Ohuchi Shinko Kagaku Kogyo Co., Ltd.)
[*8] N,N'-(4,4'-diphenylmethane)bismaleimide
[*9]E Adipic acid hydrazide
[*9]F Salicylic acid hydrazide
[*9]G Isophthalic acid hydrazide
[*9]H 2-hydroxy-3-naphthoic acid hydrazide

TABLE 9

(Compounding unit: parts by weight)

| Batch No. | Comparative Example 1 | Example 1 | Example 2 | Example 3 | Comparative Example 7 | Example 34 | Example 35 | Example 36 | Example 37 | Example 38 | Example 39 | Example 40 | Example 41 | Example 42 |
|---|---|---|---|---|---|---|---|---|---|---|---|---|---|---|
| Formulation (ingredients in Table 8, the amount of which is variable) | | | | | | | | | | | | | | |
| Carbon black ISAF | 65.0 | 65.0 | 65.0 | 65.0 | 65.0 | 65.0 | 65.0 | 65.0 | 65.0 | 65.0 | 65.0 | 65.0 | 65.0 | 65.0 |
| Silica | | | | | | | | | | | | | | |
| Si 69 | | | | | | | | | | | | | | |
| Nocceler D | 0.3 | 0.3 | 0.3 | 0.3 | 0.3 | 0.3 | 0.3 | 0.3 | 0.3 | 0.3 | 0.3 | 0.3 | 0.3 | 0.3 |
| Bismaleimide | | 1.0 | 2.0 | 4.0 | | 1.0 | 1.0 | 1.0 | 2.0 | 4.0 | 2.0 | 2.0 | 2.0 | 2.0 |
| Polyaniline E | | | | | 1.0 | 0.25 | 0.5 | 1.0 | 0.5 | 1.0 | | | | |
| Polyaniline F | | | | | | | | | | | 0.5 | 1.0 | | |
| Polyaniline G | | | | | | | | | | | | | 0.5 | |
| Polyaniline H | | | | | | | | | | | | | | 0.5 |
| Curelasto test | | | | | | | | | | | | | | |
| $M_L$ | 100 | 100 | 100 | 102 | 101 | 101 | 102 | 102 | 101 | 102 | 98 | 104 | 101 | 102 |
| $M_H$ | 100 | 110 | 115 | 123 | 99 | 112 | 115 | 120 | 121 | 128 | 119 | 125 | 116 | 117 |
| $T_{10}$ | 100 | 103 | 107 | 115 | 94 | 101 | 99 | 96 | 99 | 96 | 102 | 89 | 98 | 94 |
| $T_{90}$ | 100 | 125 | 149 | 163 | 90 | 108 | 102 | 98 | 111 | 108 | 115 | 98 | 102 | 96 |
| Blow point test | 100 | 131 | 156 | 188 | 98 | 103 | 97 | 92 | 97 | 99 | 103 | 95 | 96 | 91 |
| Tensile test | | | | | | | | | | | | | | |
| EB | 100.0 | 104.5 | 110.8 | 113.4 | 96.5 | 99.1 | 96.5 | 93.8 | 98.5 | 101.0 | 98.3 | 98.9 | 96.4 | 93.1 |
| TB | 100.0 | 103.0 | 107.2 | 105.2 | 99.0 | 101.0 | 98.0 | 97.3 | 97.5 | 100.4 | 99.5 | 102.0 | 98.9 | 99.5 |
| $M_{300}$ | 100.0 | 98.1 | 94.9 | 89.0 | 105.0 | 100.0 | 103.5 | 105.7 | 105.2 | 105.8 | 101.5 | 104.2 | 103.4 | 106.2 |
| Dynamic viscoelasticity test | | | | | | | | | | | | | | |
| E' | 100.0 | 125.6 | 133.9 | 145.0 | 102.0 | 128.2 | 133.2 | 138.5 | 141.3 | 155.4 | 139.7 | 143.5 | 135.6 | 137.9 |
| E" | 100.0 | 122.1 | 118.4 | 125.0 | 100.5 | 122.3 | 122.7 | 122.7 | 122.8 | 130.7 | 115.4 | 114.0 | 115.4 | 111.0 |
| tan δ | 100.0 | 97.2 | 88.4 | 86.2 | 98.5 | 95.4 | 92.1 | 88.6 | 86.9 | 84.1 | 82.6 | 79.4 | 85.1 | 80.5 |
| Tire performances | | | | | | | | | | | | | | |
| Maneuverability | Control | +2 | | | | +2 | | +3 | | | | | | |

TABLE 10

(Compounding unit: parts by weight)

| Batch No. | Comparative Example 3 | Example 11 | Example 43 | Example 44 | Example 45 |
|---|---|---|---|---|---|
| Formulation (ingredients in Table 8, the amount of which is variable) | | | | | |
| Carbon black ISAF | 35.0 | 35.0 | 35.0 | 35.0 | 35.0 |
| Silica | 30.0 | 30.0 | 30.0 | 30.0 | 30.0 |
| Si 69 | 3.0 | 3.0 | 3.0 | 3.0 | 3.0 |
| Nocceler D | 0.6 | 0.6 | 0.6 | 0.6 | 0.6 |
| Bismaleimide | | 2.0 | 1.0 | 2.0 | 2.0 |
| Hydrazide E | | | 0.5 | 0.5 | 1.0 |
| Hydrazide F | | | | | |
| Hydrazide G | | | | | |
| Hydrazide H | | | | | |
| Curelasto test | | | | | |
| $M_L$ | 100 | 100 | 100 | 102 | 103 |
| $M_H$ | 100 | 108 | 106 | 109 | 112 |
| $T_{10}$ | 100 | 106 | 100 | 102 | 97 |
| $T_{90}$ | 100 | 172 | 101 | 104 | 99 |
| Blow point test | 100 | 196 | 103 | 104 | 98 |
| Tensile test | | | | | |
| EB | 100.0 | 103.9 | 96.5 | 95.6 | 96.5 |
| TB | 100.0 | 94.6 | 99.5 | 100.6 | 99.8 |
| $M_{300}$ | 100.0 | 93.1 | 103.4 | 102.5 | 106.8 |
| Dynamic viscoelasticity test | | | | | |
| E' | 100.0 | 146.3 | 138.2 | 156.2 | 168.2 |
| E" | 100.0 | 136.1 | 126.5 | 141.9 | 153.4 |
| tan δ | 100.0 | 93.0 | 91.5 | 90.8 | 91.2 |

TABLE 10-continued (Compounding unit: parts by weight)

| Batch No. | Comparative Example 3 | Example 11 | Example 43 | Example 44 | Example 45 |
|---|---|---|---|---|---|
| Tire performances | | | | | |
| Maneuverability | Control | +2 | +2 | +2 | |

As seen from the above results, Comparative Example 7 is an example using hydrazide E alone, wherein although $T_{90}$, is shortened, the blow point is approximately equal to that of the control and E' hardly increases.

On the contrary, in Examples 34 to 40 using a bismaleimide and the hydrazide E together, the delay of vulcanization is improved and also the blow point is considerably improved, and E' increases and tan δ lowers as compared with Examples 1 to 3 using bismaleimide alone.

Further, it can be also understood that a similar synergistic effect is exhibited by simultaneously adopting a bismaleimide and a hydrazide, also in the blending system simultaneously adopting carbon black/silica as exhibited by Comparative Example 3, Example 11, and Examples 43 through 45.

According to this embodiment, there can be provided a rubber composition capable of improving a workability with a good productivity and having a higher elastic modulus and suitable for a tread rubber. Further, a pneumatic tire having a tread, for which such a rubber is utilized, has a superior maneuverability.

Embodiment 4

In this embodiment, concerning the rubber compositions prepared according to the basic formulation of Table 11 and according to Table 12 through Table 14, there were considered a blending effect of the maleimide compound as well as an effect when an amine compound is simultaneously used. The results are shown in Table 12 through Table 14.

TABLE 11

| | Parts by Weight |
|---|---|
| Rubber Component [1] | 100 |
| Carbon Black [2] | Variable |
| Silica [3] | Variable |
| Silane Coupling Agent [4] | Variable |
| Aroma Oil | 30 |
| Stearate | 2 |
| Zinc White | 3 |
| Antioxidant [5] | 1 |
| Vulcanization Accelerator [6] | Variable |
| Vulcanization Accelerator [7] | 1 |
| Sulfur | 1.75 |
| Bismaleimide [8] | Variable |
| Amine Compound A, B, or C [9] | Variable |

[1] SBR1500 (Trademark: manufactured by JSR Co., Ltd.)
[2] Seast (Trademark: ISAF manufactured by Tokai Carbon Co., Ltd.)
[3] Nipsil AQ (Trademark: manufactured by Nippon Silica Kogyo Co., Ltd.)
[4] Si69 (Trademark: manufactured by Degussa AG of German)
[5] Noclac 6C (Trademark: manufactured by Ohuchi Shinko Kagaku Kogyo Co., Ltd.)
[6] Nocceler D (Trademark: manufactured by Ohuchi Shinko Kagaku Kogyo Co., Ltd.)
[7] Nocceler NS (Trademark: manufactured by Ohuchi Shinko Kagaku Kogyo Co., Ltd.)
[8] N,N'-(4,4'-diphenylmethane)bismaleimide
[9] A dimethyl stearylamine/stearic acid salt
[9] B stearylamine/stearic acid salt
[9] C dimethyl stearylamine

TABLE 12

(Compounding unit: parts by weight)

| Batch No. | Comparative Example 8 | Example 15 | Example 16 | Example 17 | Comparative Example 9 | Example 46 | Example 47 | Example 48 | Example 49 | Example 50 | Example 51 | Example 52 | Example 53 | Example 54 |
|---|---|---|---|---|---|---|---|---|---|---|---|---|---|---|
| Formulation (ingredients in Table 11, the amount of which is variable) | | | | | | | | | | | | | | |
| Carbon black ISAF | 60.0 | 60.0 | 60.0 | 60.0 | 60.0 | 60.0 | 60.0 | 60.0 | 60.0 | 60.0 | 60.0 | 60.0 | 60.0 | 60.0 |
| Silica | 5.0 | 5.0 | 5.0 | 5.0 | 5.0 | 5.0 | 5.0 | 5.0 | 5.0 | 5.0 | 5.0 | 5.0 | 5.0 | 5.0 |
| Si 69 | | | | | | | | | | | | | | |
| Nocceler D | 0.3 | 0.3 | 0.3 | 0.3 | 0.3 | 0.3 | 0.3 | 0.3 | 0.3 | 0.3 | 0.3 | 0.3 | 0.3 | 0.3 |
| Bismaleimide | | 1.0 | 2.0 | 4.0 | | 2.0 | 2.0 | 2.0 | 4.0 | 4.0 | 2.0 | 2.0 | 2.0 | 2.0 |
| Polyaniline A | | | | | 2.0 | 1.00 | 2.0 | 4.0 | 2.0 | 4.0 | | | | |
| Polyaniline B | | | | | | | | | | | 2.0 | 4.0 | | |
| Polyaniline C | | | | | | | | | | | | | 1.0 | 2.0 |
| Curelasto test | | | | | | | | | | | | | | |
| $M_L$ | 100 | 100 | 100 | 102 | 98 | 99 | 98 | 96 | 97 | 102 | 98 | 96 | 98 | 96 |
| $M_H$ | 100 | 110 | 115 | 123 | 103 | 109 | 111 | 123 | 115 | 131 | 111 | 123 | 111 | 123 |
| $T_{10}$ | 100 | 103 | 107 | 115 | 95 | 101 | 99 | 96 | 99 | 96 | 99 | 96 | 99 | 96 |
| $T_{90}$ | 100 | 125 | 149 | 163 | 93 | 107 | 105 | 96 | 109 | 106 | 106 | 97 | 103 | 95 |
| Blow point test | 100 | 131 | 156 | 188 | 96 | 105 | 101 | 95 | 97 | 99 | 102 | 95 | 101 | 95 |

TABLE 12-continued (Compounding unit: parts by weight)

| Batch No. | Comparative Example 8 | Example 15 | Example 16 | Example 17 | Comparative Example 9 | Example 46 | Example 47 | Example 48 | Example 49 | Example 50 | Example 51 | Example 52 | Example 53 | Example 54 |
|---|---|---|---|---|---|---|---|---|---|---|---|---|---|---|
| Tensile test | | | | | | | | | | | | | | |
| $M_{300}$ | 100.0 | 98.1 | 94.9 | 89.0 | 102.1 | 100.0 | 103.5 | 105.7 | 105.2 | 105.8 | 105.1 | 104.3 | 101.2 | 100.2 |
| Dynamic viscoelasticity test | | | | | | | | | | | | | | |
| E' | 100.0 | 125.6 | 133.9 | 145.0 | 101.2 | 133.6 | 135.2 | 136.8 | 141.3 | 148.1 | 135.9 | 136.5 | 137.2 | 138.1 |
| tan δ | 100.0 | 97.2 | 88.4 | 86.2 | 97.2 | 88.3 | 87.5 | 87.1 | 86.9 | 85.2 | 88.1 | 87.1 | 85.2 | 84.1 |
| Tire performances | | | | | | | | | | | | | | |
| Maneuverability | Control | | +2 | | | | +2 | | | +3 | | | | |

TABLE 13

(Compounding unit: parts by weight)

| Batch No. | Comparative Example 3 | Example 11 | Example 55 | Example 56 | Example 57 |
|---|---|---|---|---|---|
| Formulation (ingredients in Table 11, the amount of which is variable) | | | | | |
| ISAF Carbon Black | 35.0 | 35.0 | 35.0 | 35.0 | 35.0 |
| Silica | 30.0 | 30.0 | 30.0 | 30.0 | 30.0 |
| Si 69 | 3.0 | 3.0 | 3.0 | 3.0 | 3.0 |
| Nocceler D | 0.6 | 0.6 | 0.6 | 0.6 | 0.6 |
| Bismaleimide | | 2.0 | 2.0 | 2.0 | 2.0 |
| Amine A | | | 1.0 | 2.0 | 4.0 |
| Amine B | | | | | |
| Amine C | | | | | |
| Curelasto test | | | | | |
| $M_L$ | 100 | 100 | 97 | 92 | 87 |
| $M_H$ | 100 | 108 | 107 | 109 | 111 |
| $T_{10}$ | 100 | 106 | 100 | 102 | 97 |
| $T_{90}$ | 100 | 172 | 111 | 104 | 99 |
| Blow point test | 100 | 196 | 115 | 108 | 97 |
| Tension Test | | | | | |
| $M_{300}$ | 100.0 | 93.1 | 99.8 | 99.9 | 101.2 |
| Dynamic viscoelasticity test | | | | | |
| E' | 100.0 | 146.3 | 148.2 | 149.3 | 151.2 |
| tan δ | 100.0 | 93.0 | 89.1 | 86.5 | 83.5 |
| Tire performances | | | | | |
| Maneuverability | Control | +2 | +2 | +3 | |

TABLE 14

(Compounding unit: parts by weight)

| Batch No. | Comparative Example 6 | Example 30 | Example 58 | Example 59 | Example 60 |
|---|---|---|---|---|---|
| Formulation (ingredients in Table 11, the amount of which is variable) | | | | | |
| ISAF Carbon Black | 5.0 | 5.0 | 5.0 | 5.0 | 5.0 |
| Silica | 60.0 | 60.0 | 60.0 | 60.0 | 60.0 |
| Si 69 | 6.0 | 6.0 | 6.0 | 6.0 | 6.0 |
| Nocceler D | 0.9 | 0.9 | 0.9 | 0.9 | 0.9 |
| Bismaleimide | | 2.0 | 2.0 | 2.0 | 2.0 |
| Amine A | | | 1.0 | 2.0 | 4.0 |
| Amine B | | | | | |
| Amine C | | | | | |
| Curelasto test | | | | | |
| $M_L$ | 100 | 93 | 89 | 87 | 81 |
| $M_H$ | 100 | 97 | 98 | 101 | 99 |
| $T_{10}$ | 100 | 106 | 102 | 99 | 91 |
| $T_{90}$ | 100 | 158 | 104 | 98 | 92 |
| Blow point test | 100 | 178 | 109 | 103 | 95 |
| Tension test | | | | | |
| $M_{300}$ | 100.0 | 85.8 | 99.0 | 101.0 | 102.0 |
| Dynamic viscoelasticity test | | | | | |
| E' | 100.0 | 144.5 | 143.1 | 142.5 | 143.2 |
| tan δ | 100.0 | 102.0 | 98.0 | 96.0 | 92.0 |
| Tire performance | | | | | |
| Maneuverability | Control | +2 | +1 | +2 | +4 |

From the above results, the amine addition salt itself tends to promote a vulcanization reaction in Comparative Example 9, but this is 10% or less relative to Comparative Example 8 and is not a large effect.

Contrary, in Examples 46 through 54 simultaneously adopting a bismaleimide and an amine compound, the E' value is remarkably increased while substantially maintaining the $M_{300}$ value, so that not only the maneuverability on a wet road surface is improved, but also the delay of vulcanization is remarkably improved and the blow point is remarkably improved. Further, it can be understood that a similar synergistic effect is exhibited by simultaneously adopting a bismaleimide and an amine compound, in the systems including a large blending amount of silica as exhibited by Comparative Example 3, Example 11 and Examples 55 through 57

According to this embodiment, there can be provided a rubber composition capable of improving a workability with a good productivity and having a higher elastic modulus and a lower heat build-up, which rubber composition is suitable for a tread rubber. Further, a pneumatic tire having a tread, for which such a rubber is utilized, has a superior maneuverability and rolling resistance.

Embodiment 5

In this embodiment, concerning the rubber compositions prepared according to the basic formulation of Table 15 and according to Table 16 through Table 18, there was considered a blending effect when an oligomer or polymer of bismaleimide is used as a maleimide compound. The results are shown in Table 16 through Table 18.

TABLE 15

| | Parts by Weight |
|---|---|
| Rubber Component [*1] | 100 |
| Carbon Black [*2] | Variable |
| Silica [*3] | Variable |

TABLE 15-continued

| | Parts by Weight |
|---|---|
| Silane Coupling Agent [*4] | Variable |
| Aroma Oil | 30 |
| Stearate | 2 |
| Zinc White | 3 |
| Antioxidant [*5] | 1 |
| Vulcanization Accelerator [*6] | Variable |
| Vulcanization Accelerator [*7] | 1 |
| Sulfur | 1.75 |
| Maleimide Compound A, B, or C [*8] | Variable |

[*1] SBR1500 (Trademark: manufactured by JSR Co., Ltd.)
[*2] Seast (Trademark: ISAF manufactured by Tokai Carbon Co., Ltd.)
[*3] Nipsil AQ (Trademark: manufactured by Nippon Silica Kogyo Co., Ltd.)
[*4] Si69 (Trademark: manufactured by Degussa AG of German)
[*5] Noclac 6C (Trademark: manufactured by Ohuchi Shinko Kagaku Kogyo Co., Ltd.)
[*6] Nocceler D (Trademark: manufactured by Ohuchi Shinko Kagaku Kogyo Co., Ltd.)
[*7] Nocceler NS (Trademark: manufactured by Ohuchi Shinko Kagaku Kogyo Co., Ltd.)
[*8]A Nocceler PM-P (Trademark: manufactured by Ohuchi Shinko Kagaku Kogyo Co., Ltd.)
[*8]B Kelimid B601(Trademark: manufactured by Asahi Chiba Co., Ltd.)
[*8]C BT4680 (Trademark: manufactured by Mitsubishi Gas Chemical Co., Inc.)

TABLE 16

(Compounding unit: parts by weight)

| Batch No. | Comparative Example 1 | Example 61 | Example 62 | Example 63 | Example 64 | Example 65 |
|---|---|---|---|---|---|---|
| Formulation (ingredients in Table 15, the amount of which is variable) | | | | | | |
| Carbon black ISAF | 65.0 | 65.0 | 65.0 | 65.0 | 65.0 | 65.0 |
| Silica | | | | | | |
| Si 69 | | | | | | |
| Nocceler D | 0.3 | 0.3 | 0.3 | 0.3 | 0.3 | 0.3 |
| Maleimide compound A | | 2.0 | | | | |
| Maleimide compound B | | | 1.0 | 2.0 | 3.0 | |
| Maleimide compound C | | | | | | 2.0 |
| Curelasto test | | | | | | |
| $M_L$ | 100 | 100 | 101 | 102 | 102 | 102 |
| $M_H$ | 100 | 115 | 111 | 115 | 120 | 113 |
| $T_{10}$ | 100 | 107 | 104 | 107 | 106 | 105 |
| $T_{90}$ | 100 | 149 | 98 | 102 | 104 | 106 |
| Blow point test | 100 | 156 | 99 | 97 | 96 | 101 |
| Tension test | | | | | | |
| $E_B$ | 100.0 | 110.8 | 102.0 | 103.0 | 99.0 | 105 |
| $T_B$ | 100.0 | 107.2 | 101.0 | 98.0 | 97.0 | 102 |
| $M_{300}$ | 100.0 | 94.9 | 100.0 | 100.8 | 102.0 | 98.0 |
| Dynamic viscoelasticity test | | | | | | |
| E' | 100.0 | 133.9 | 116.0 | 130.0 | 144.0 | 132.0 |
| tan δ | 100.0 | 88.4 | 95.0 | 87.0 | 86.0 | 95.1 |

TABLE 16-continued (Compounding unit: parts by weight)

| Batch No. | Comparative Example 1 | Example 61 | Example 62 | Example 63 | Example 64 | Example 65 |
|---|---|---|---|---|---|---|
| Tire performance | | | | | | |
| Maneuverability | Control | +2 | Not exercised | +2 | Not exercised | +2 |

TABLE 17

(Compounding unit: parts by weight)

| Batch No. | Comparative Example 3 | Example 66 | Example 67 | Example 68 | Example 69 | Example 70 |
|---|---|---|---|---|---|---|
| Formulation (ingredients in Table 15, the amount of which is variable) | | | | | | |
| Carbon Black ISAF | 35.0 | 35.0 | 35.0 | 35.0 | 35.0 | 35.0 |
| Silica | 30.0 | 30.0 | 30.0 | 30.0 | 30.0 | 30.0 |
| Si 69 | 3.0 | 3.0 | 3.0 | 3.0 | 3.0 | 3.0 |
| Nocceler D | 0.6 | 0.6 | 0.6 | 0.6 | 0.6 | 0.6 |
| Maleimide compound A | | 2.0 | | | | |
| Maleimide compound B | | | 1.0 | 2.0 | 3.0 | |
| Maleimide compound C | | | | | | 2.0 |
| Curelasto test | | | | | | |
| $M_L$ | 100 | 100 | 100 | 104 | 102 | 103 |
| $M_H$ | 100 | 108 | 106 | 107 | 105 | 106 |
| $T_{10}$ | 100 | 106 | 103 | 103 | 105 | 105 |
| $T_{90}$ | 100 | 171 | 102 | 105 | 108 | 107 |
| Blow point test | 100 | 196 | 103 | 95 | 86 | 101 |
| Tension test | | | | | | |
| $E_B$ | 100.0 | 103.9 | 98.0 | 99.0 | 97.2 | 102 |
| $T_B$ | 100.0 | 94.6 | 96.0 | 94.2 | 95.6 | 100 |
| $M_{300}$ | 100.0 | 93.1 | 102.0 | 104.0 | 106.0 | 96.2 |
| Dynamic viscoelasticity test | | | | | | |
| E' | 100.0 | 137.0 | 124.0 | 144.0 | 158.0 | 142.1 |
| tan δ | 100.0 | 105.0 | 95.0 | 91.0 | 90.0 | 96.5 |
| Tire performance | | | | | | |
| Maneuverability | Control | +2 | +1 | +2 | +3 | +2 |

TABLE 18

(Compounding unit: parts by weight)

| Batch No. | Comparative Example 6 | Example 71 | Example 72 | Example 73 | Example 74 | Example 75 |
|---|---|---|---|---|---|---|
| Formulation (ingredients in Table 15, the amount of which is variable) | | | | | | |
| Carbon Black ISAF | 5.0 | 5.0 | 5.0 | 5.0 | 5.0 | 5.0 |
| Silica | 60.0 | 60.0 | 60.0 | 60.0 | 60.0 | 60.0 |
| Si 69 | 6.0 | 6.0 | 6.0 | 6.0 | 6.0 | 6.0 |
| Nocceler D | 0.9 | 0.9 | 0.9 | 0.9 | 0.9 | 0.9 |

TABLE 18-continued (Compounding unit: parts by weight)

| Batch No. | Comparative Example 6 | Example 71 | Example 72 | Example 73 | Example 74 | Example 75 |
|---|---|---|---|---|---|---|
| Maleimide compound A | | 2.0 | | | | |
| Maleimide compound B | | | 1.0 | 2.0 | 3.0 | |
| Maleimide compound C | | | | | | 2.0 |
| Curelasto test | | | | | | |
| $M_L$ | 100 | 93 | 100 | 104 | 103 | 103 |
| $M_H$ | 100 | 97 | 99 | 101 | 102 | 102 |
| $T_{10}$ | 100 | 106 | 102 | 104 | 105 | 108 |
| $T_{90}$ | 100 | 158 | 96 | 98 | 100 | 103 |
| Blow point test | 100 | 178 | 105 | 104 | 101 | 108 |
| Tension test | | | | | | |
| $E_B$ | 100.0 | 107.9 | 101.0 | 99.5 | 96.3 | 105 |
| $T_B$ | 100.0 | 98.2 | 99.0 | 97.0 | 95.0 | 102 |
| $M_{300}$ | 100.0 | 85.8 | 98.0 | 102.0 | 103.0 | 87.9 |
| Dynamic viscoelasticity Test | | | | | | |
| E' | 100.0 | 139.0 | 120.0 | 146.0 | 160.0 | 143.2 |
| tan δ | 100.0 | 108.0 | 101.0 | 99.0 | 97.0 | 101.8 |
| Tire performance | | | | | | |
| Maneuverability | Control | +3 | +1 | +3 | +4 | +3 |

From the above results, when 2.0 parts by weight of bismaleimide is blended into Comparative Example 1 (i.e., in Example 61), E' is increased by 30% or more, and the tire performance is also remarkably improved. Further, by adopting an oligomer or polymer of bismaleimide, E' is remarkably increased similarly to the situation adopting a bismaleimide, while $T_{90}$ and blow point value are not so affected that the productivity is not deteriorated.

Further, when these rubber compositions were used as a tire tread, there was obtained a higher maneuverability of tire substantially identical with the case of bismaleimide.

Substantially same effects were also confirmed in the systems simultaneously adopting carbon black and silica as exhibited by Comparative Example 3 and Examples 66 through 70, and in the systems adopting a large amount of silica as exhibited by Comparative Example 6 and Examples 71 through 75.

According to this embodiment, there can be provided a rubber composition capable of improving a workability with a good productivity and having a higher elastic modulus and suitable for a tread rubber. Further, a pneumatic tire having a tread, for which such a rubber is utilized, has a superior maneuverability.

Embodiment 6

In this embodiment, concerning the rubber compositions prepared according to the basic formulation of Table 19 and according to Table 20 or Table 21, there was considered a blending effect of various maleimide compounds. The results are shown in Table 20 and Table 21.

TABLE 19

| | Parts by Weight |
|---|---|
| Rubber Component [1] | 100 |
| Carbon Black [2] | Variable |
| Silica [3] | Variable |
| Silane Coupling Agent [4] | Variable |
| Aroma Oil | 30 |
| Stearate | 2 |
| Zinc White | 3 |
| Antioxidant [5] | 1 |
| Vulcanization Accelerator [6] | Variable |
| Vulcanization Accelerator [7] | 1 |
| Sulfur | 1.75 |
| Maleimide Compound D, E, F, C or H [8] | Variable |

[1] SBR1500 (Trademark: manufactured by JSR Co., Ltd.)
[2] Seast (Trademark: ISAF manufactured by Tokai Carbon Co., Ltd.)
[3] Nipsil AQ (Trademark: manufactured by Nippon Silica Kogyo Co., Ltd.)
[4] Si69 (Trademark: manufactured by Degussa AG of German)
[5] Noclac 6C (Trademark: manufactured by Ohuchi Shinko Kagaku Kogyo Co., Ltd.)
[6] Nocceler D (Trademark: manufactured by Ohuchi Shinko Kagaku Kogyo Co., Ltd.)
[7] Nocceler NS (Trademark: manufactured by Ohuchi Shinko Kagaku Kogyo Co., Ltd.)
[8]D N,N'-(1,3-phenylene)bismaleimide
[8]E 1,3-bis(citraconimide)benzene
[8]F 1,3-bis(citraconimidemethyl)benzene
[8]G N-phenyl maleimide
[8]H N-methyl maleimide
[8]I N,N'-(4,4'-diphenylmethane)bismaleimide

TABLE 20

(Compounding unit: parts by weight)

| Batch No. | Comparative Example 3 | Example 66 | Example 76 | Example 77 | Example 78 | Example 79 | Example 80 | Example 81 | Example 82 |
|---|---|---|---|---|---|---|---|---|---|
| Formulation (ingredients in Table 19, the amount of which is variable) | | | | | | | | | |
| Carbon black ISAF | 35.0 | 35.0 | 35.0 | 35.0 | 35.0 | 35.0 | 35.0 | 35.0 | 35.0 |
| Silica | 30.0 | 30.0 | 30.0 | 30.0 | 30.0 | 30.0 | 30.0 | 30.0 | 30.0 |
| Si 69 | 3.0 | 3.0 | 3.0 | 3.0 | 3.0 | 3.0 | 3.0 | 3.0 | 3.0 |
| Nocceler D | 0.6 | 0.6 | 0.6 | 0.6 | 0.6 | 0.6 | 0.6 | 0.6 | 0.6 |
| Maleimide compound D | | 2.0 | | | | | | | |
| Maleimide compound E | | | 2.0 | | | | | | |
| Maleimide compound F | | | | 2.0 | | | | | |
| Maleimide compound G | | | | | 2.0 | | | | |
| Maleimide compound H | | | | | | 2.0 | | | |
| Maleimide compound I | | | | | | | 1.0 | 2.0 | 3.0 |
| Tensile test | | | | | | | | | |
| $M_{300}$ | 100.0 | 94.9 | 96 | 91 | 75 | 87 | 98 | 96 | 95 |
| Dynamic viscoelasticity test | | | | | | | | | |
| E' | 100.0 | 137.0 | 127.4 | 116.4 | 136.2 | 123.2 | 124.0 | 136.0 | 148.0 |
| tan δ | 100.0 | 105.0 | 114.7 | 118.6 | 114.4 | 115.9 | 98.0 | 97.5 | 98.0 |
| Tire performances | | | | | | | | | |
| Rolling resistance | 100 | 97 | | | 94 | | | 101 | 102 |
| Maneuverability | Control | 2 | | | 2 | | | 2 | 3 |

TABLE 21

(Compounding unit: parts by weight)

| Batch No. | Comparative Example 6 | Example 71 | Example 83 | Example 84 | Example 85 |
|---|---|---|---|---|---|
| Formulation (ingredients in Table 19, the amount of which is variable) | | | | | |
| Carbon black ISAF | 5.0 | 5.0 | 5.0 | 5.0 | 5.0 |
| Silica | 60.0 | 60.0 | 60.0 | 60.0 | 60.0 |
| Si 69 | 6.0 | 6.0 | 6.0 | 6.0 | 6.0 |
| Nocceler D | 0.9 | 0.9 | 0.9 | 0.9 | 0.9 |
| Maleimide compound A | | 2.0 | | | |
| Maleimide compound I | | | 1.0 | 2.0 | 3.0 |
| Tension test | | | | | |
| $M_{300}$ | 100.0 | 89.0 | 95 | 93 | 89 |
| Dynamic viscoelasticity test | | | | | |
| E' | 100.0 | 139.0 | 122.0 | 137.0 | 149.0 |
| tan δ | 100.0 | 108.0 | 100.0 | 99.0 | 101.0 |
| Tire performance | | | | | |
| Rolling Resistance | 100 | 94 | 100 | 100 | |
| Maneuverability | Control | 2 | | 2 | 3 |

Maleimide Compound I: 1,3-phenylene bismaleimide

As seen from the above results, $M_{300}$ is decreased and E' is largely increased to improve the maneuverability of tire by using a maleimide compound. Particularly, in case of using N,N'-(methylene-di-p-phenylene) bismaleimide as shown in Examples 80, 81 and 82, E' increases to improve the maneuverability of the tire but also tan δ at 60° C. becomes smaller than that of the control (Comparative Example 3) and the rolling resistance of the tire becomes substantially equal to the control.

It can be seen that even in the system using a large amount of silica as shown in Comparative Example 6, Example 71 and Examples 83 to 85, the maneuverability of the tire and rolling resistance of the tire can simultaneously be established at a higher level, which has never been attained in the conventional technique, by compounding bismaleimide, particularly N,N'-(4,4'-diphenylmethane) bismaleimide.

Embodiment 7

In this embodiment, the compounding effect using 1,3-phenylene bismaleimide as a maleimide compound is examined with respect to rubber compositions prepared according to the formulation of Table 22. The results are shown in Table 22.

TABLE 22

(Compounding unit: parts by weight)

| | Comparative Example 10 | Example 86 |
|---|---|---|
| E-SBR | 100 | 100 |
| ZrO | 5 | 5 |
| Stearic acid | 3 | 3 |
| Silica | 50 | 50 |
| Process oil | 3 | 3 |
| Vulcanization accelerator/S | 0.8/2.2 | 0.8/2.2 |
| Maleimide compound I | 0 | 2 |
| Hardness | 68 | 68 |
| E' (MPa) | 11.3 | 15.5 |
| $M_{300}$ (MPa) | 7.65 | 7.31 |
| Maneuverability | Control | +3 |

Vulcanization accelerator: N-oxydiethylene-2-benzothiazyl sulfeneamide

Maleimide compound I: 1,3-phenylene bismaleimide

As seen from the test results, the balance between E' and $M_{300}$ (large deformation modulus) can be optimized in Example 86, and particularly, distribution of ground contact pressure of a tire on a wet road surface having a low frictional coefficient is uniformized to improve maneuvering performance on a wet road surface.

As mentioned above, according to the invention, there can be provided a rubber composition capable of improving maneuverability on a slippery wet road surface having an extremely low frictional coefficient and having a low rolling resistance without exerting upon the productivity of tire and other performances.

What is claimed is:

1. A rubber composition comprising
   a rubber ingredient comprising at least one rubber selected from the group consisting of natural rubber and synthetic diene rubber,
   at least one maleimide compound and
   at least one nitrogen-containing compound selected from the group consisting of polyaniline, hydrazide and amine compound,
wherein said amine compound is at least one amine compound selected from the group consisting of an amine represented by the following general formula (5) and an amine addition salt represented by the following general formula (6):

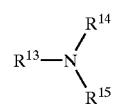
(5)

wherein $R^{13}$ is a saturated or an unsaturated alkyl group having a carbon number of 8–24, an aryl group having a carbon number of 6–24 or an aralkyl group having a carbon number of 7–24, $R^{14}$ and $R^{15}$ are a hydrogen atom, a saturated or an unsaturated alkyl group having a carbon number of 1–12, an aryl group having a carbon number of 6–12, an aralkyl group having a carbon number of 7–12, —(CH$_2$O)$_p$H, —(CH$_2$CH$_2$O)$_p$H, —(CH(CH$_3$)CH$_2$O)$_p$H or —(CH$_2$CH$_2$CH$_2$O)$_p$H, respectively, provided that a total value of p in $R^{14}$ and $R^{15}$ is an integer of 1–4;

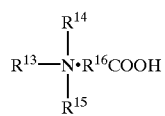
(6)

wherein $R^{13}$–$R^{15}$ as defined above and $R^{16}$ is a saturated or an unsaturated alkyl group having a carbon number of 6–24, an aryl group having a carbon number of 6–24 or an aralkyl group having a carbon number of 7–24.

2. A rubber composition according to claim 1, wherein said nitrogen-containing compound is a polyaniline represented by the following general formula (1):

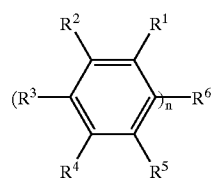
(1)

wherein $R^1$, $R^2$, $R^3$, $R^4$ and $R^5$ each independently represents H or NH$_2$, at least one of $R^1$–$R^5$ is NH$_2$, n is an integer of not less than 2, $R^6$ is n-valent saturated, unsaturated, aliphatic, aromatic, branched or straight chain hydrocarbon residue, —O—, —S—, —SO$_2$— or an n-valent saturated, unsaturated, aliphatic, aromatic, branched or straight chain hydrocarbon residue containing at least one hetero atom.

3. A rubber composition according to claim 2, wherein the polyaniline is bis(3-aminophenyl)sulphone, 4,4'-(m-phenylene diisopropylidene)dianiline, or an aromatic polyaniline represented by the following general formula (2):

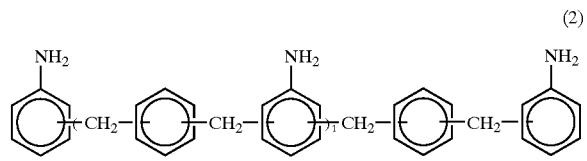
(2)

wherein 1 is an integer of not less than 0.

4. A rubber composition according to claim 1, wherein said nitrogen-containing compound is a hydrazide represented by the following general formula (3) or (4):

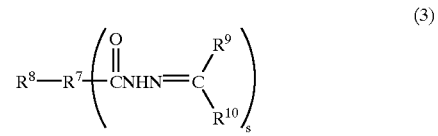
(3)

wherein $R^7$ is a non-cyclic aliphatic group having a carbon number of 2–18, a non-cyclic aliphatic group having an aromatic group therein and having a carbon number of 2–18, a cyclic aliphatic group having a carbon number of 5–20, a cyclic aliphatic group having at least one hetero atom selected from the group consisting of O, N and S and having a carbon number of 5–20, an aromatic group having a carbon number of 6–18, an aromatic group having at least one hetero atom selected from the group consisting of O, N and S and having a carbon number of 6–18, an alkyl aromatic group having a carbon number of 7–24 or an alkyl aromatic group having at least one hetero atom selected from the group consisting of O, N and S and having a carbon number of 7–24, $R^8$ is a hydrogen atom, a hydroxy group, an amino group or a mercapto group, $R^9$ and $R^{10}$ are a hydrogen atom, an alkyl group having a carbon number of 1–18, an alkyl group having at least one hetero atom selected from the group consisting of O, N and S and having a carbon number of 1–18, a cyclohexyl group, a cyclohexyl group having at least one hetero atom selected from the group consisting of O, N and S, an aromatic group or an aromatic group having at least one hetero atom selected from the group consisting of O, N and S, and are the same or different, and s is an integer of 1–3;

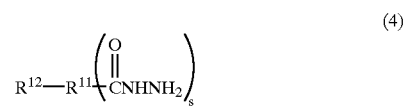
(4)

wherein $R^{11}$ is a non-cyclic aliphatic group having a carbon number of 2–18, a non-cyclic aliphatic group having at least one hetero atom of O, N and S and having a carbon number of 2–18, a non-cyclic aliphatic group having an aromatic group therein and having a carbon number of 2–18, a non-cyclic aliphatic group having an aromatic group therein, having at least one hetero atom of O, N and S and having a carbon number of 2–18, a cyclic aliphatic group having a carbon number of 5–20, a cyclic aliphatic group having at least one hetero atom of O, N and S and having a carbon number of 5–20, an aromatic group having a carbon number of 6–18, an aromatic group having at least one hetero atom of O, N and S and having a carbon number of 6–18, an alkyl aromatic group having a carbon number of 7–24 or an alkyl aromatic group having at least one hetero atom of O, N and S and having a carbon number of 7–24, $R^{12}$ is a hydroxy group, an amino group, a hydrazide group or a mercapto group; and 5 is an integer of 1–3.

5. A rubber composition according to claim 4, wherein the hydrazide is 1-hydroxy, N'-(1-methylethylidene)-2-naphthoic acid hydrazide, 1-hydroxy, N'-(1-methylpropylidene)-2-naphthoic acid hydrazide, 1-hydroxy, N'-(1-methylbutylidene)-2-naphthoic acid hydrazide, 1-hydroxy, N'-(1,3-dimethylbutylidene)-2-naphthoic acid hydrazide, 1-hydroxy, N'-(2,6-dimethyl-4-heptylidene)-2-naphthoic acid hydrazide, 1-hydroxy, N'-(2-furylmethylene)-2-naphthoic acid hydrazide, 3-hydroxy, N'-(1-methylethylidene)-2-naphthoic acid hydrazide, 3-hydroxy, N'-(1-methylpropylidene)-2-naphthoic acid hydrazide, 3-hydroxy, N'-(1-methylbutylidene)-2-naphthoic acid hydrazide, 3-hydroxy, N'-(1,3-dimethylbutylidene)-2-naphthoic acid hydrazide, 2-hydroxy, N'-(2,6-dimethyl-4-heptylidene)-3-naphthoic acid hydrazide, 2-hydroxy, N'-(2-furylmethylene)-3-naphthoic acid hydrazide, isophthalic acid di(1-methylethylidene)hydrazide, isophthalic acid di(1-methylpropylidene)hydrazide, isophthalic acid di(1-methylbutylidene)hydrazide, isophthalic acid di(1,3-dimethylbutylidene)hydrazide, isophthalic acid di(2,6-dimethyl-4-heptylidene)hydrazide, isophthalic acid di(2-furylmethylene) hydrazide, isonicotinic acid (1-methylethylidene)hydrazide, isonicotinic acid (1-methylpropylidene)hydrazide, isonicotinic acid (1-methylbutylidene) hydrazide, isonicotinic acid (2,6-dimethyl-4-heptylidene)hydrazide, isonicotinic acid (1,3-dimethylbutylidene)hydrazide, isonicotinic acid (2-furylmethylene)hydrazide, N'-(1-methylethylidene)-salicylic acid hydrazide, N'-(1-methylpropylidene)-salicylic acid hydrazide, N'-(1-methylbutylidene)-salicylic acid hydrazide, N'-(1,3-dimethylbutylidene)-salicylic acid hydrazide, N'-(2,6-dimethyl-4-heptylidene)-salicylic acid hydrazide, N'-(2-furylmethylene)-salicylic acid hydrazide, adipic acid dihydrazide, isophthalic acid dihydrazide, salicylic acid hydrazide or 2-hydroxy-3-naphthoic acid hydrazide.

6. A rubber composition according to claim 1, wherein in the general formulae of the amine and the amine addition salt, $R^{14}$ and $R^{15}$ independently are a saturated or an unsaturated alkyl groups having a carbon number of 1–8, and a total value of the carbon number in $R^{13}$, $R^{14}$ and $R^{15}$ in each of the amine and the amine addition salt is 10–24.

7. A rubber composition according to claim 1, wherein the amine is dimethyl stearylamine or stearylamine.

8. A rubber composition according to claim 1, wherein the amine addition salt is a stearic acid salt of dimethyl stearylamine or a stearic acid salt of methyl stearylamine.

9. A rubber composition according to claim 1, wherein the maleimide compound is a bismaleimide compound, or an oligomer or polymer of maleimide.

10. A rubber composition according to claim 9, wherein the oligomer or polymer of maleimide is an oligomer or polymer of bismaleimide.

11. A rubber composition comprising at least one of natural rubber and synthetic diene rubbers as a rubber ingredient and at least one maleimide compound selected from the group consisting of bismaleimide, oligomer and polymer of bismaleimide.

12. A rubber composition according to claim 9, wherein the bismaleimide compound is at least one compound represented by the following general formula (7):

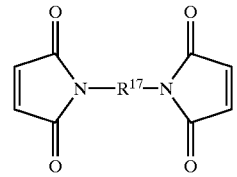

wherein $R^{17}$ is $R^{18}$ or $R^{19}$-$R^{18}$-$R^{20}$, $R^{18}$ is an aromatic group having a carbon number of 6–18, an alkyl aromatic group having a carbon number of 7–24 or a methylene group, and $R^{19}$ and $R^{20}$ are an alkylene group having a carbon number of 1–3 or a phenylene group, respectively.

13. A rubber composition according to claim 11, wherein the bismaleimide compound is at least one compound represented by the following general formula (7):

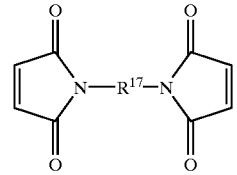

wherein $R^{17}$ is $R^{18}$ or $R^{19}$-$R^{18}$-$R^{20}$, $R^{18}$ is an aromatic group having a carbon number of 6–18, an alkyl aromatic group having a carbon number of 7–24 or a methylene group, and $R^{19}$ and $R^{20}$ are an alkylene group having a carbon number of 1—3 or a phenylene group, respectively.

14. A rubber composition according to claim 12, wherein the bismaleimide compound is at least one selected from the group consisting of N,N'-(4,4'-diphenylmethane) bismaleimide and N,N'-(1,3-phenylene) bismaleimide.

15. A rubber composition according to claim 13, wherein the oligomer or polymer of a bismaleimide is at least one of a polyamino bismaleimide resin and a bismaleimide triazine resin.

16. A rubber composition according to claim 1, further comprising at least one filler selected from the group consisting of carbon black and silica.

17. A rubber composition according to claim 1, further comprising at least one vulcanization accelerator selected from the group consisting of thiazoles, thiurams and dithiocarbamates.

18. A rubber composition according to claim 1, wherein the rubber ingredient contains not less than 50% by weight of at least one rubber selected from the group consisting of styrene-butadiene copolymer rubber and butadiene rubber.

19. A rubber composition according to claim 1, wherein the rubber ingredient contains not less than 50% by weight of styrene-butadiene copolymer rubber.

20. A rubber composition according to claim 18, wherein the styrene-butadiene copolymer rubber is obtained by emulsion polymerization.

21. A rubber composition according to claim 1, wherein the maleimide compound is compounded in an amount of 0.1–30 parts by weight per 100 parts by weight of the rubber ingredient.

22. A rubber composition according to claim 1, wherein the polyaniline is compounded at a ratio of 10–200% by weight of the maleimide compound.

23. A rubber composition according to claim 1, wherein the hydrazide is compounded at a ratio of 5–200% by weight of the maleimide compound.

24. A rubber composition according to claim 1, wherein the amine compound is compounded at a ratio of 50–400% by weight of the maleimide compound.

25. A rubber composition according to claim 1, wherein a dynamic storage modulus (E') is 7.0–16.0 MPa, and a tensile stress at 300% elongation ($M_{300}$) is 7.0–15.0 MPa.

26. A pneumatic tire comprising a tread portion, wherein a rubber composition comprising a rubber ingredient comprising at least one rubber selected from the group consisting of natural rubber and synthetic diene rubbers, at least one maleimide compound, and at least one nitrogen-containing compound selected from the group consisting of polyaniline, hydrazide and amine compound is used as a rubber composition constituting the tread portion.

27. A pneumatic tire comprising a tread portion, wherein a rubber composition comprising a rubber ingredient comprising at least one rubber selected from the group consisting of natural rubber and synthetic diene rubbers, at least one maleimide compound selected from the group consisting of bismaleimide, an oligomer of bismaleimide and a polymer of bismaleimide is used as a rubber composition constituting the tread portion.

* * * * *